United States Patent
Lee et al.

(10) Patent No.: US 9,636,801 B1
(45) Date of Patent: May 2, 2017

(54) VISE SYSTEM HAVING MODULAR MECHANISM AND METHOD OF MANUFACTURE THEREOF

(71) Applicant: Glacern Machine Tools, LLC, Torrance, CA (US)

(72) Inventors: Steven Lee, Rancho Palos Verdes, CA (US); Eric Sun, Redondo Beach, CA (US); Cynthia Hu, Rolling Hills Estates, CA (US)

(73) Assignee: Glacern Machine Tools, LLC, Los Angeles, CA (US)

( * ) Notice: Subject to any disclaimer, the term of this patent is extended or adjusted under 35 U.S.C. 154(b) by 118 days.

(21) Appl. No.: 14/527,497

(22) Filed: Oct. 29, 2014

Related U.S. Application Data

(60) Provisional application No. 61/897,822, filed on Oct. 30, 2013.

(51) Int. Cl.
| | | |
|---|---|---|
| *B23Q 3/02* | (2006.01) | |
| *B25B 1/02* | (2006.01) | |
| *B25B 1/24* | (2006.01) | |
| *B23Q 3/06* | (2006.01) | |

(52) U.S. Cl.
CPC ............ *B25B 1/2484* (2013.01); *B23Q 3/066* (2013.01); *B25B 1/02* (2013.01)

(58) Field of Classification Search
CPC .. B25B 1/10; B25B 1/103; B25B 1/20; B25B 1/24; B25B 1/2473; B25B 1/2478; B23Q 3/06; B23Q 3/066; B23Q 3/02
See application file for complete search history.

(56) References Cited

U.S. PATENT DOCUMENTS

| | | | | |
|---|---|---|---|---|
| 3,051,473 A | * | 8/1962 | Juhase | B25B 1/10 269/95 |
| 4,043,547 A | * | 8/1977 | Glomb | B25B 1/125 269/136 |
| 4,413,818 A | * | 11/1983 | Lenz | B25B 1/2484 269/244 |
| 4,529,183 A | * | 7/1985 | Krason | B25B 1/103 269/136 |
| 4,685,663 A | * | 8/1987 | Jorgensen | B25B 1/103 269/244 |
| 4,930,760 A | * | 6/1990 | Mirkovic | B23Q 3/061 269/134 |
| 4,934,674 A | * | 6/1990 | Bernstein | B25B 1/103 269/136 |
| 5,374,040 A | * | 12/1994 | Lin | B25B 1/103 269/154 |
| 5,562,277 A | * | 10/1996 | Swann | B23Q 3/103 269/152 |
| 5,634,253 A | * | 6/1997 | Swann | B23Q 3/103 269/154 |
| 6,045,126 A | * | 4/2000 | Brzezinski | B25B 1/2452 269/240 |
| D436,012 S | * | 1/2001 | Lavigne | D8/74 |

(Continued)

*Primary Examiner* — Joseph J Hail
*Assistant Examiner* — Tyrone V Hall, Jr.

(57) ABSTRACT

A vise system and method of manufacture of thereof includes: a base frame having an upper rail, a base portion, and a vise channel; a handhold vent in a lateral sidewall of the base portion; a jaw carrier assembly within the vise channel of the base frame; and a jaw assembly attached to the jaw carrier assembly.

19 Claims, 17 Drawing Sheets

(56) References Cited

U.S. PATENT DOCUMENTS

| | | | |
|---|---|---|---|
| 6,206,354 B1 * | 3/2001 | Lin | B25B 1/103 269/136 |
| 6,409,161 B1 * | 6/2002 | Wolff | B25B 1/18 269/134 |
| 6,896,249 B1 * | 5/2005 | Ferrara | B25B 1/12 269/138 |
| 7,163,201 B2 * | 1/2007 | Bernstein | B25B 1/103 269/32 |
| 8,408,527 B2 * | 4/2013 | Klingenberg | B25B 1/103 269/154 |
| D685,828 S * | 7/2013 | Sun | D15/140 |
| 2003/0071402 A1 * | 4/2003 | Martinez | B25B 1/06 269/43 |
| 2014/0021667 A1 * | 1/2014 | Wang | B25B 1/103 269/20 |

* cited by examiner

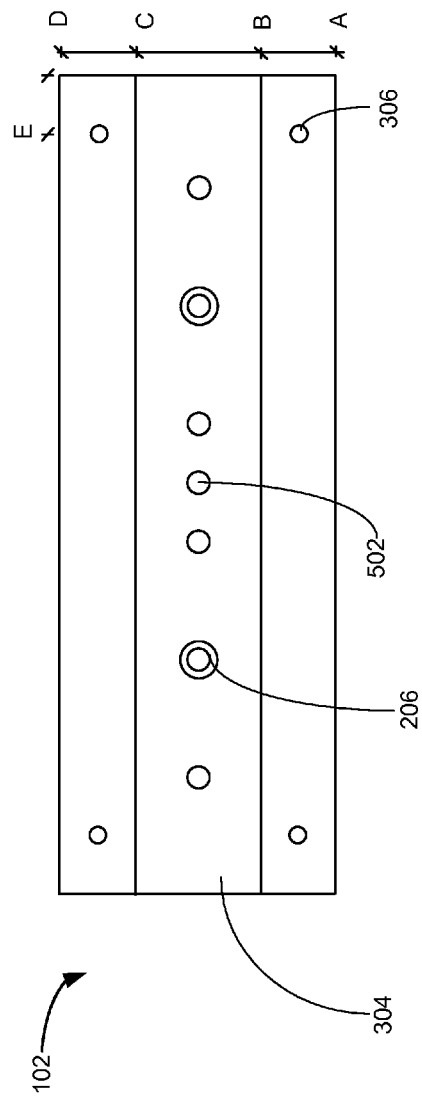
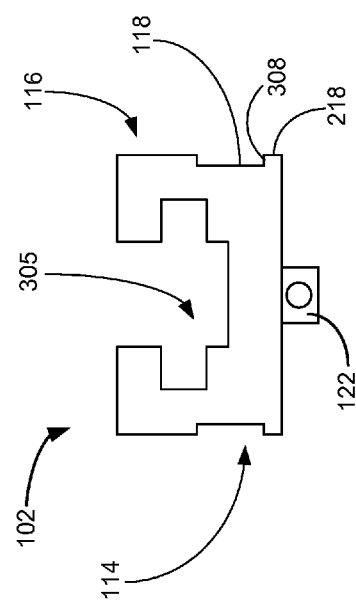
FIG. 5
FIG. 6

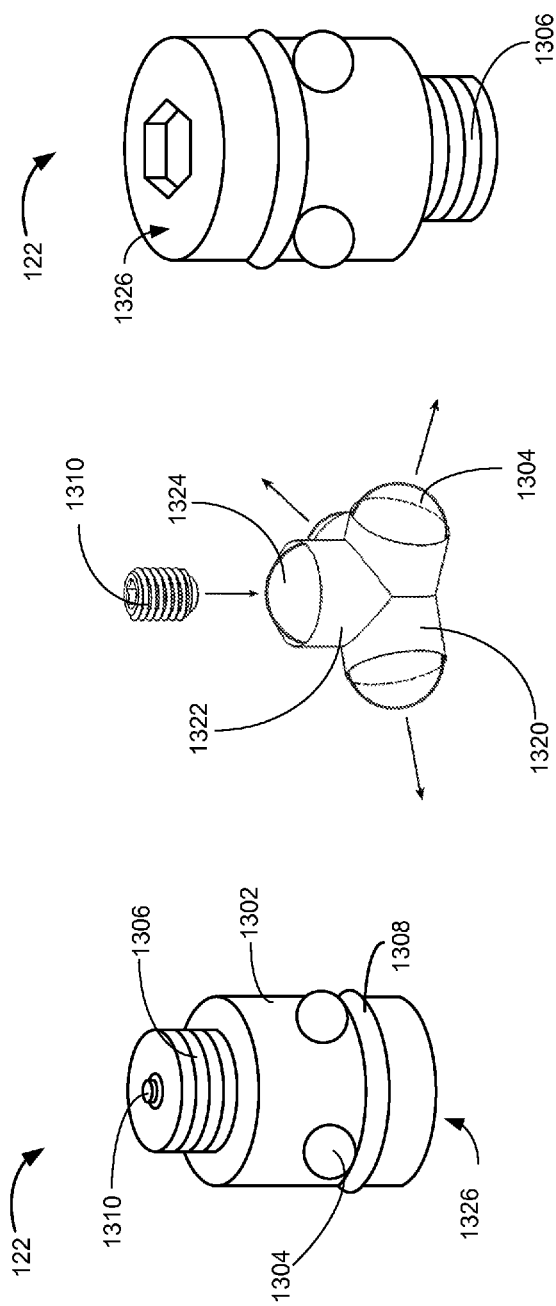

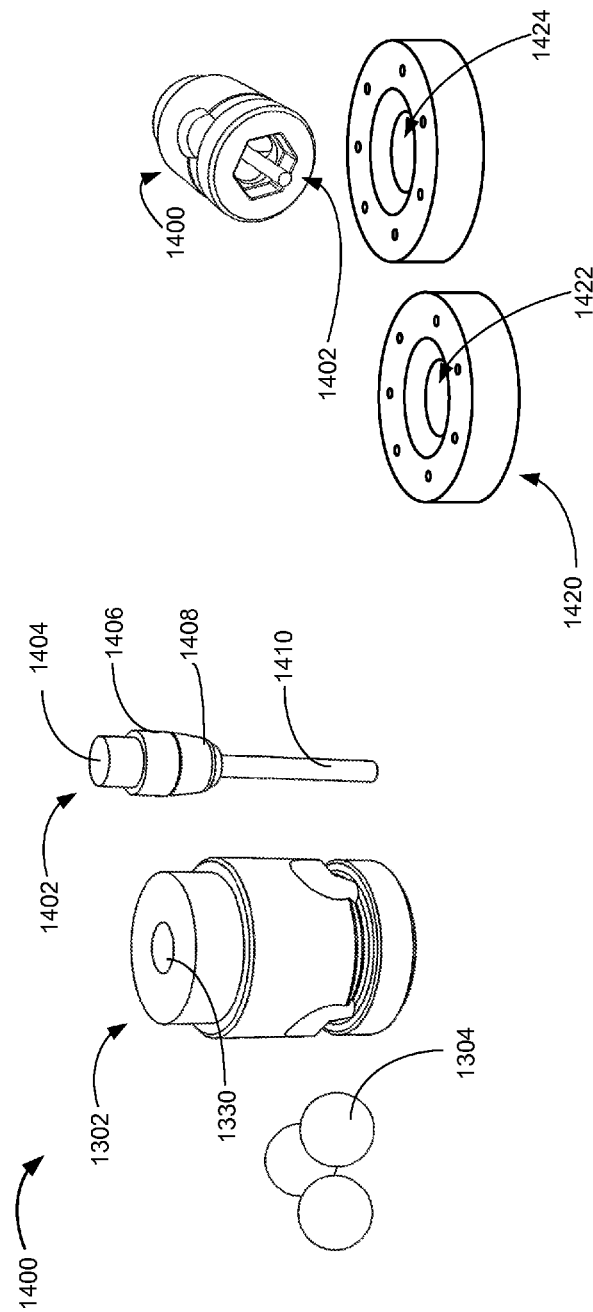

VISE SYSTEM HAVING MODULAR MECHANISM AND METHOD OF MANUFACTURE THEREOF

CROSS-REFERENCE TO RELATED APPLICATION(S)

This application claims the benefit of U.S. Provisional Patent Application Ser. No. 61/897,822 filed Oct. 30, 2013, and the subject matter thereof is incorporated herein by reference thereto.

TECHNICAL FIELD

The present invention relates generally to a vise system and more particularly to a vise system having module mechanism.

BACKGROUND ART

Modern tools and manufacturing techniques have increased the complexity of machine tools. This complexity has increased the specialization and set up times that are required in workshops of all sizes. The uses of various manufacturing materials also require machine tools to have increased levels of functionality and strength to support these materials. It is desirable to simplify and reduce the specialization of these tools for increasing the versatility and access to machine tools to all experience levels.

Often, the tools available lack efficient setup times and lack precision and uniformity in tool centering, which causes deviations in manufacturing of other products. These problems cause wasted materials and increased costs from the lack of setup precision and uniformity. Thus, machine tools are needed to address the complexities of workshops while increasing functionality, improving setup speed, and increasing precision of zeroing and tool centering.

Solutions to these problems have been long sought but prior developments have not taught or suggested any solutions and, thus, solutions to these problems have long eluded those skilled in the art.

DISCLOSURE OF THE INVENTION

The embodiments of the present invention provide a method of manufacture of a vise system including: providing a bar; forming a base frame from the bar including: forming a base portion; forming a first rail and a second rail, the first rail and the second rail above the base portion, and forming a vise channel in the base portion, the vise channel between the first upper rail and the second upper rail; and forming a handhold vent in a lateral sidewall of the base portion.

The embodiments of the present invention provide a vise system including: a base frame having an upper rail, a base portion, and a vise channel; a handhold vent in a lateral sidewall of the base portion; a jaw carrier assembly within the vise channel of the base frame; and a jaw assembly attached to the jaw carrier assembly.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 5 is a top view of the base frame.

FIG. 6 is an end view of the base frame of the modular vise system of FIG. 1.

FIG. 13A is a detailed isometric top view of the frame lock of FIG. 1.

FIG. 13B is a detailed view of the internal channels of the frame lock of FIG. 13A.

FIG. 13C is a detailed isometric bottom view of the frame lock.

FIG. 14A is a frame lock in a second embodiment of the present invention.

FIG. 14B is an example diagram with a receiving ring and the frame lock.

BEST MODE FOR CARRYING OUT THE INVENTION

Figure 1:
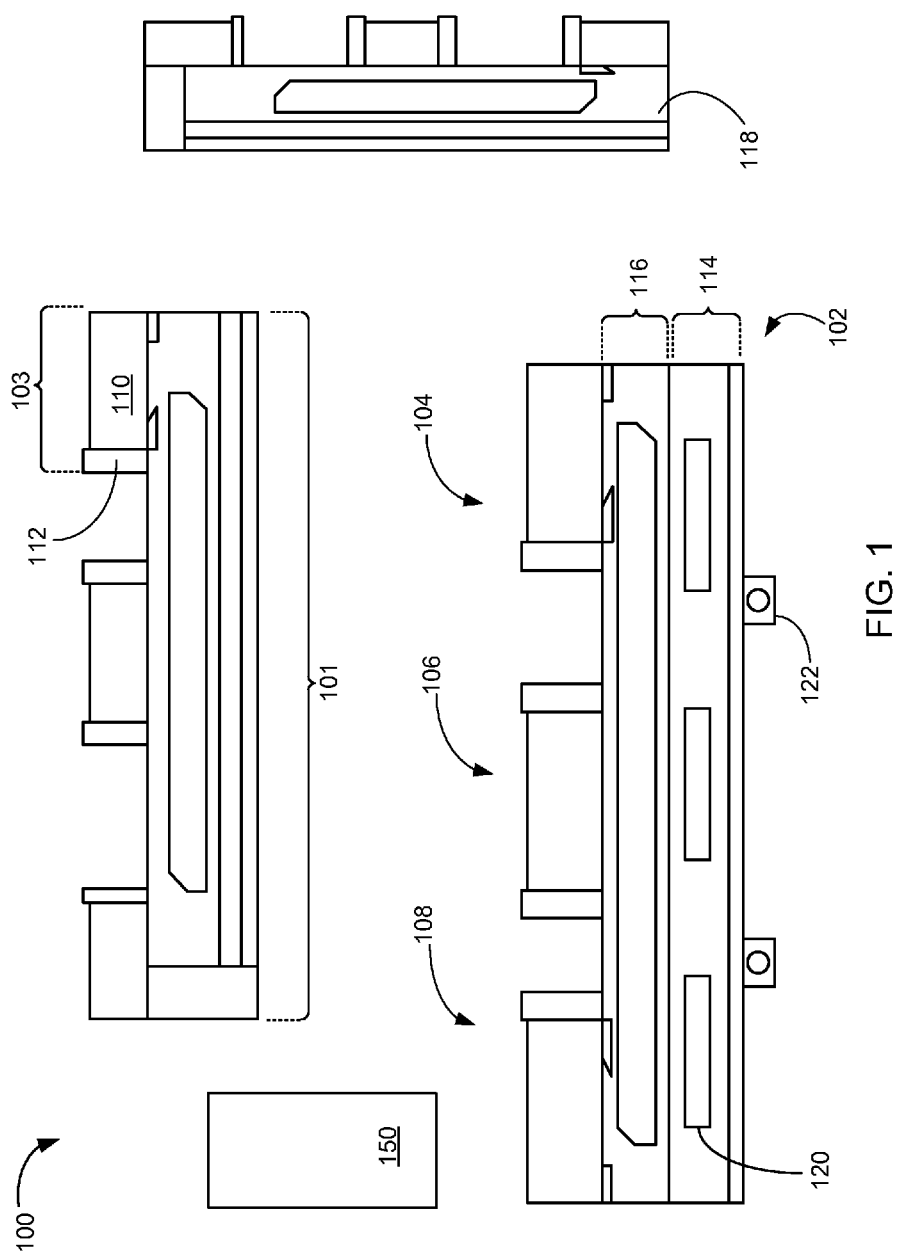
FIG. 1 is an example diagram of a side view of a modular vise system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention.

However, it will be apparent that the invention may be practiced without these specific details. In order to avoid obscuring the embodiments of the present invention, some well-known devices, instrument configurations, and process steps are not disclosed in detail.

For expository purposes, the term "horizontal" as used herein is defined as the horizontal direction seen when viewing the drawing as indicated by the figure designation of "FIG.". The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal, as shown in the figures. The term "on" means there is direct contact between the elements described.

Also, in the following description, connected and coupled are used to describe a relationship between two members. The term "attached" means that the two members are physically joined or directly joined to each other.

Different members can be connected in variety of ways. For example, different members can be connected by being formed adjacent to each other, such as through molding or carving. Also, for example, different members can be connected by being attached together, such as through clamping, adhesives, fasteners, welds, or brazing.

The term "coupled" means that the two members are physically linked through one or more other members. The phrases "reciprocating motion" and "reciprocating movement" are defined to describe a repetitive up-and-down or back-and-forth motion.

The term "modular" means that a component can employ or involve a module or modules as the basis of design or construction. The modules can be interchangeable and replaceable, which allows for quick swapping and setup times.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part.

Referring now to FIG. 1, therein is shown an example diagram of a side view of a modular vise system 100 in a first embodiment of the present invention. The example diagram depicts three examples of the modular vise system 100 having different system lengths.

The different system lengths are designed for use on machine tables and tombstones and to fit into the chamber of a computer numerical control (CNC) mill. For illustrative purposes, the example vise systems can include a length 101 of twelve inches, sixteen inches, and twenty inches.

The modular vise system 100 can include a base frame 102 and a jaw assembly 103. The base frame 102 can include the body of the vise system and can support the jaw assembly 103. The base frame 102 can be formed from a bar 150. The bar 150 can include a bar stock of durable metal including cast iron, continuous cast iron, steel, or durabar. For example, the base frame 102 can be formed from a single piece of the bar 150. For illustrative purposes, the bar 150 can be a single rectangular piece over six inches wide.

The modular vise system 100 can include multiple jaw assemblies for clamping different objects simultaneously. The modular vise system 100 can include a first jaw 104, a center jaw 106, and a second jaw 108 in a double vise configuration.

For example, the double vise configuration can include the center jaw 106 locked in position. The first jaw 104 can be moved towards the center jaw 106 for clamping. After the first jaw 104 has clamped an object, the second jaw 108 can be moved toward the center jaw 106 using sequential jaw movement for clamping a second object. For example, in a double vise configuration, the modular vise system 100 can allow two work pieces to be clamped for milling and machining.

The example diagram shows the modular vise system 100 in the double vise configuration although it is understood that the modular vise system 100 is not limited to a double vise. The modular vise system 100 can include a single, triple, quad, and so forth configuration with the use of additional fixture plates, fixture clamps, and step jaws.

Further, the first jaw 104, the center jaw 106, and the second jaw 108 can include a modular configuration where the jaws can be quickly removed and interchanged. For example, the center jaw 106 can be removed from the base frame 102 for converting the modular vise system 100 into a single vise configuration. The interchangeable and modular jaw system will be explained in further detail below.

It has been discovered that the modular vise system 100 can be converted into a single station vise by removing the center jaw 106, and fastening down the second jaw 108. The first jaw 104 and the second jaw 108 can be converted into a fixed jaw by using locating pins or dowels that anchor the jaws in place. The conversion process can be done during operation of the vise without the need for additional fixture plates or the need to disassemble the modular vise system 100.

Further, it has been found that the modular vise system 100 can be converted into a single-station reversed vise by anchoring the first jaw 104 so that the second jaw 108 slides or clamps toward the first jaw 104. The ability to anchor both the first jaw 104 or the second jaw 108 provides for workplace flexibility, options for adjusting milling machine offsets (machine, fixture and tool offsets) to positive or negative directions, and eliminates the need to rotate the base frame 102 if the clamping action must occur from another direction.

The jaw assembly 103 can include a jaw body 110 and a jaw plate 112. For example, the first jaw 104, the second jaw 108, and the center jaw 106 can each include the jaw body 110 and the jaw plate 112. The center jaw 106 can include a set of two jaw plates mounted to each side of the jaw body 110 of the center jaw 106.

The jaw plate 112 is removable and can be constructed from a variety of materials. For example, the jaw plate 112 can include a soft jaw plate, steel jaw plate, aluminum jaw plate, or combination thereof. Hard jaw plates can include a material hardness of Hugh Rockwell C fifty (50 HRC) on the Rockwell scale.

The base frame 102 can include a base portion 114 and an upper rail 116. The base portion 114 provides a platform for supporting the upper rail 116. The base frame 102 can include the upper rail 116 and another of the upper rail 116. The two upper rails are parallel with each other. The base portion 114 can include a lateral sidewall 118.

The base portion 114 of the base frame 102 can include a handhold vent 120. The handhold vent 120 is defined as a hole formed in the lateral sidewall 118 of the base portion 114. The handhold vent 120 provides multiple functions for the modular vise system 100. For example, the handhold vent 120 provides evacuation holes for debris and chips to exit from the inner channel of the base frame 102. These evacuation holes provide for easy cleaning as debris can be vacuumed away without having to dissemble the components of the modular vise system 100.

Further, it has been found that the specific design and dimensions of the handholds provide grip and stability to the modular vise system 100 while decreasing the overall weight of the modular vise system 100. For example, a twenty-inch model of the modular vise system 100 can include three of the handhold vent 120 evenly distributed along the lateral sidewall 118.

The configuration of the three vents, facilities lifting and docking of the base frame 102 at convenient locations for handholds. It has been found that the configuration and placement of three of the handhold vent 120 on each side of the frame is designed for a single lifter or for two lifters to grip and move the base frame 102. An operator can change handholds for more leverage and to support different portions of the base frame 102.

It has also been found that the handhold vent 120 includes dimensions that are designed to accommodate the human hand, while the handhold openings are not large enough to decrease the structural stability of the base frame 102. The dimensions designed to accommodate the human hand can include a width with a range of 2.5 inches to 3.5 inches and a height within a range of 0.5 inches to 1.5 inches.

Further, it has been found that the handhold vent 120 can function as a clamping interface for external clamps to secure the modular vise system 100 to a machine table, work platform, or tombstone. Clamps can be inserted into the handhold vent 120 for providing a surface for clamping down the base frame 102. It has been found that the length of 3 inches and a height of 1 inch for the handhold vent 120 provides the grip and frame stability needed to increase the movability and access to the modular vise system 100 in a workshop environment.

The modular vise system 100 includes a frame lock 122 or frame coupler mounted to the base frame 102. The frame lock 122 are bolts or pins for locating, docking, and aligning the base frame to a machine table, fixture plate, or tombstone. The frame lock 122 can be mounted on a bottom surface of the base frame 102. The frame lock 122 can be interchanged or swapped to couplers of different sizes and interface configurations. The frame lock 122 will be explained in further detail below.

The components of the modular vise system 100, including the base frame 102 and the jaws, are powder coated and nickel plated for abrasion and corrosion resistance. The base frame 102 of the modular vise system 100 can be hardened to HRC 50 and the body is fully stress relieved. The modular vise system 100 can include jaw plates and jaw carriers or assemblies with HRC 50 hardness. The material used for the base frame 102 can include a metallic material that is resistant to porosity, slag, hard spots, shrinkage, defects, and impurities. It has been found that the heat-treat hardening of the base frame 102 to a HRC of 50 produces a fine-grained microstructure, which permits faster machining and extended tool life.

The material used to form the base frame 102 can include a continuous casting process. The continuous casting involves pulling bars through a graphite die at the bottom of a crucible filled with molten iron. Dross, slag, and other impurities float to the top of the crucible and are prevented from contaminating the cast bars.

The method of manufacturing the base frame 102 includes cutting bar stock into the correct sizes with a bandsaw in a step. In another step, the bar stock is loaded into a milling machine. In another step, the bar stock is milled to form the rails and then the holes on the top of the base frame 102.

In another step, the bar stock is switched to a second position for milling the handhold vent 120 and the features at the bottom of the vise. The base frame 102 is removed from the milling machine for heat treatment to strengthen the entire frame structure.

The base frame 102 is heated to 800-1100 degrees F. to reduce thermal and mechanical stresses for dimensional stability. In another step, the base frame 102 is hardened using quench and temper methods by heating to 1550-1700 degrees F. then quenching in a polymer. It has been found that the purpose of the heating and quenching process is for the conversion of the matrix to martensite, a very hard form of crystalline steel.

Further, it has been found that the heat treatment and hardening of the entire frame of the base frame 102 to a HRC of over 50 provides uniform material strength, uniform holding force, and wear resistance for all of the portions of the base frame 102. The entire structure of the base frame 102 includes a uniform hardening to prevent warpage and weakened holding strength during operation of the vise. The strengthen structure after heat treatment includes a holding strength of over 10,000 pounds (lbs.). It has also been found that the use of continuous cast iron, such as durabar, prevents the need for carburization in order to harden through heat-treating.

Because of the extreme heat used in the hardening process, the base frame 102 is loaded into a cage assembly to quench the base frame 102. The cage assembly prevents damage to lifting machinery, forklifts, and pallets used in the transfer and cooling process.

The base frame 102, the jaw plate 112, the frame lock 122, and a docking ring for the frame lock 122 can be heat-treated and harden using the same method, above. The base frame 102 and other components such as nuts and cover plates are powder coated to prevent corrosion and rust. The base frame 102 is ground flat for a very flat and smooth surface finish. The bottom of the base frame 102 can be ground flat before the hardening process.

It has been found that the modular vise system 100 can include modular jaw plates that are quick change and interchangeable for reducing installation and for providing multiple functions and configurations. For example, the jaw plate 112 can include plates with different surface configurations, hardness levels, and grips for different clamping and gripping functions. The different jaw plates are modular and can be interchanged when attaching to the jaw body 110.

It has been found that the system lengths of 12-inches, 16-inches, and 20-inches facilitate usability, conserve space, and cover manufacturing requirements for large-scale and full production environments, one-off prototype production environments, and single small-scale workshop environments. Further, the modular vise system 100 can include a width of 6-inches wide. The system lengths of the modular vise system 100 allow for the modular vise system 100 with large holding capacities to be mounted within a work chamber of a CNC milling machine.

It has been found that the modular vise system 100 with a HRC of 50 and the jaw carrier with a HRC of 50 hardness dramatically extends the life and strengthens the materials when using the modular vise system 100 in machine tool manufacturing. Heat treating the vise components to an HRC level of over 50 dramatically extends the life and strengthens the materials.

It has been found that the base frame 102 and jaw plates with a heat-treat hardening of HRC 50 and above prevents product distortion and reduces yield costs. Heat treatment, such as flame hardening, increases surface hardness and wear resistance. Actual HRC hardness is a function of the carbon content of the particular steel. The more carbon content, the higher the hardness. To increase durability during machine tool manufacturing, the hardness of the components of the modular vise system 100 can range from Rockwell 42 to 60. A tempering operation is used to slightly soften the hardened case to increase the product's durability.

Figure 2:
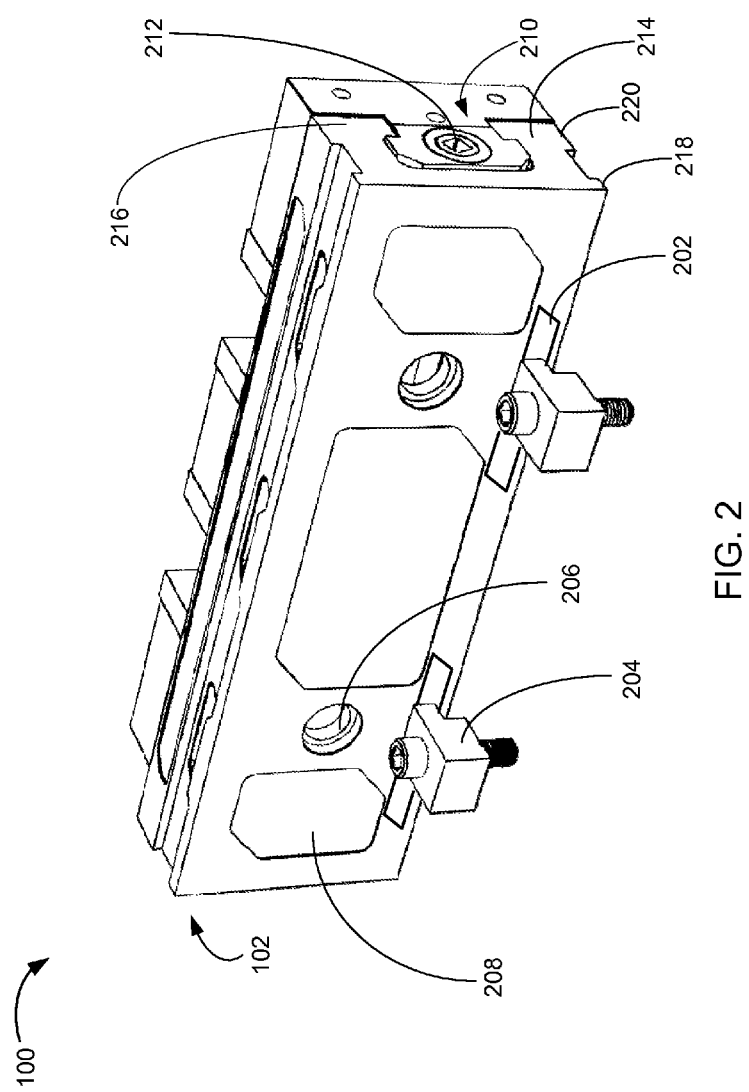
FIG. 2 is an isometric view of the bottom of the modular vise system.

Referring now to FIG. 2, therein is shown an isometric view of the bottom of the modular vise system 100. The isometric view depicts the bottom structures of the modular vise system 100 including a bottom slot 202, a coupler interface 206, and a relief plate 208.

The modular vise system 100 can include the bottom slot 202 for clamping the modular vise system 100 to machine tables, tombstones, and work platforms. The bottom slot 202 can include a groove, a channel, or a recess formed in a bottom surface of the base frame 102 of FIG. 1. The modular vise system 100 can include at least one of the bottom slot 202. For example, the modular vise system 100 can include four of the bottom slot 202 arranged along the perimeter of the bottom surface of the base frame 102.

A toe clamp 204 can interface with the bottom slot 202 for clamping the modular vise system 100 to work surfaces. For example, the toe clamp 204 can lock into the bottom slot 202 and the toe clamp 204 can be positioned anywhere along the groove of the bottom slot 202. The toe clamp 204 locks into the bottom slot 202 for clamping or locking the modular vise system 100 to machine tables, tombstones, and work platforms.

It has been found that the bottom slot 202 provides clamping flexibility for the modular vise system 100 by allowing the modular vise system 100 to be clamped vertically and horizontally. For example, the bottom slot 202 provides clamping options, such as allowing the modular vise system 100 to be clamped vertically to a tombstone or work platform of CNC system. Further, the bottom slot 202 allows the modular vise system 100 to be clamped on its side with the lateral sidewall 118 of FIG. 1 directly facing the table or work platform.

The modular vise system 100 can include the coupler interface 206 at the bottom surface of the base frame 102. The coupler interface 206 can include a screw hole for the frame lock 122 of FIG. 1. The coupler interface 206 completely passes through the bottom surface of the base frame 102 to the top surface. The frame lock 122 can be screwed into the coupler interface 206 for securing the modular vise system 100 to a work platform, tombstone, or machine table. The coupler interface 206 can include a diameter of one and a half (1.5) inches.

The modular vise system 100 can include the relief plate 208 on the bottom surface of the base frame 102. The relief plate 208 is a recessed portion of the bottom surface of the base frame 102. The relief plate 208 provides relief from suction and facilitates the sliding of the base frame 102 on a flat surface.

The modular vise system 100 is depicted with three of the relief plate 208 on the bottom surface of the base frame 102. The middle plate on the bottom surface of the base frame 102 can also provide an area for labeling the base or providing a badge or logo.

The modular vise system 100 can include a jaw carrier assembly 210. The jaw carrier assembly 210 supports the first jaw 104 of FIG. 1 and the second jaw of FIG. 1 and provides the clamping mechanism for the modular vise system 100. The jaw carrier assembly 210 can include two carriers or two nuts that move or clamp towards each other.

The components of the jaw carrier assembly 210 will be explained in further detail below.

The jaw carrier assembly 210 can include a drive socket 212. The drive socket 212 is an interface for attaching a socket wrench to operate the jaw carrier assembly 210. For example, a socket wrench or ratchet can be docked with the drive socket 212 for opening and closing the jaw carrier assembly 210.

The drive socket 212 is positioned flat against the periphery end of the base frame 102 and the drive socket 212 does not exceed the footprint of the base frame 102. The configuration and positioning of the drive socket 212 prevents the need for separate adaptors or parts that would increase the footprint of the modular vise system 100. This feature is critical for preventing damage to CNC milling machines chambers. It has been found that the components of the jaw carrier assembly 210 do not extend beyond the footprint of the base frame 102. For example, the moveable nuts of the jaw carrier assembly 210 do not move beyond the outer edges of the base frame 102, which do not obstruct or interfere with the moving parts of a machine mill.

The upper rail portion of the base frame 102 can include a first rail 214 and a second rail 216. The first rail 214 and the second rail 216 have top surfaces that are parallel with each other. The first rail 214 and the second rail 216 are formed by a channel in the base portion 114 of FIG. 1 of the base frame 102.

The base frame 102 can include a base leg 218 and a rail leg 220. The base leg 218 and the rail leg 220 provide support for the modular vise system 100, when the modular vise system 100 is operated sideways. The base leg 218 is a sidewall attached to and perpendicular with the bottom surface of the base frame 102. The rail leg 220 is a sidewall of the upper rail 116 of FIG. 1. The lateral sidewall 118 is between the base leg 218 and the rail leg 220. The base leg 218 and the rail leg 220 elevate the lateral sidewall 118 up from the surface of a table allowing space for chips and debris to fall out of the handhold vent 120 of FIG. 1. The base leg 218 is coplanar to the rail leg 220 to provide a flat and stable work platform for supporting the base frame 102. The base leg 218 and the rail leg 220 include a distance of a quarter inch (¼") from the lateral sidewall 118. The base leg 218 and the rail leg 220 provide a steady and level foundation for operating the modular vise system 100 on its side.

Figure 3:
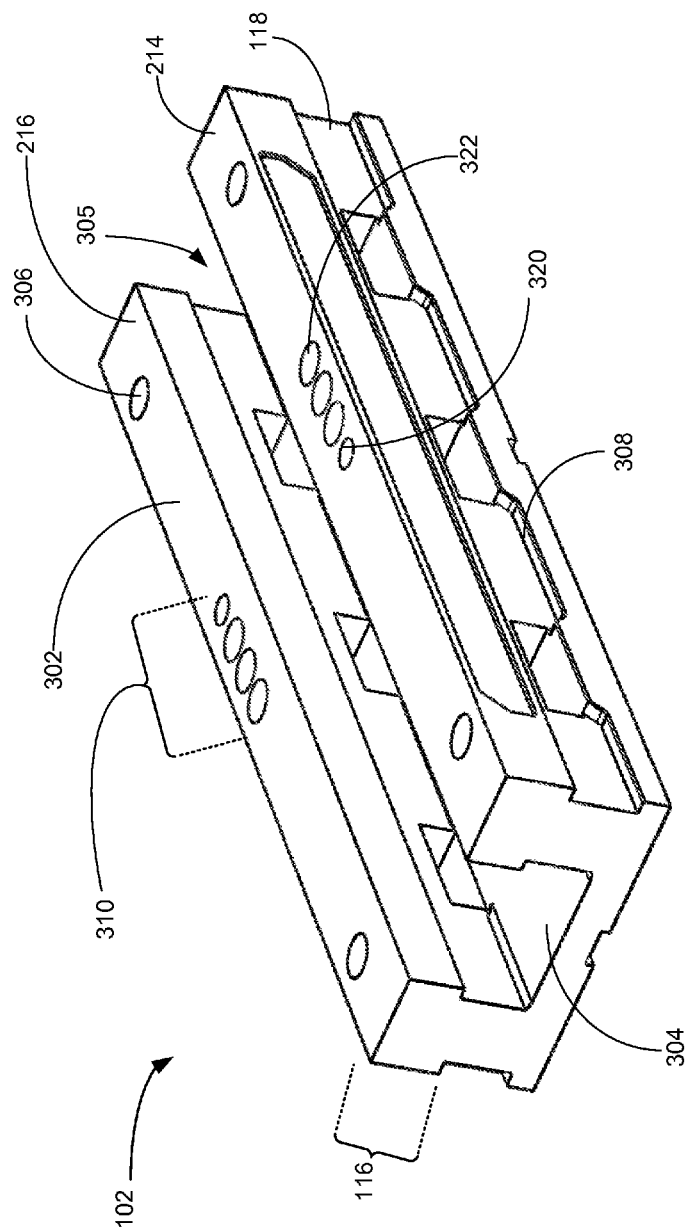
FIG. 3 is an isometric view of the base frame.

Referring now to FIG. 3, therein is shown an isometric view of the base frame 102. The isometric view shows the base frame 102 with the jaw carrier assembly 210 of FIG. 2 and the jaws removed. The isometric view can show a rail top surface 302 of the upper rail 116 and a channel top surface 304 of the base portion 114 of FIG. 1. A vise channel 305 is formed into the base portion and between the rails of the upper rail 116.

The base frame 102 can include a jaw anchor hole 306 on the rail top surface 302 of the upper rail 116. The jaw anchor hole 306 can include a hole to insert locating pins or dowels for securing the jaw assembly 103 of FIG. 1 to the base frame 102. The rail top surface 302 can include a total of four of the jaw anchor hole 306 with an anchor hole on each peripheral end of each rail.

The jaw anchor hole 306 can be used to anchor or secure the first jaw 104 of FIG. 1, the second jaw 108 of FIG. 1, or a combination thereof to the rail top surface 302. For example, the first jaw 104 can be locked into place by using the jaw anchor hole 306 to secure the first jaw 104.

By locking or anchoring the first jaw 104, the modular vise system 100 can be converted into a reverse single vise by removing the center jaw 106 of FIG. 1. The first jaw 104 is locked in place causing the second jaw 108, which is not anchored, to move towards the first jaw 104 in the reverse single vise configuration. Conversion can be accomplished quickly because the jaw assembly 103 is secured with dowels on the bottom surface of the jaw. The jaw assembly 103 can be lifted up and the dowels can be removed for unlocking the jaw assembly 103.

The base frame 102 can also include a clamping ledge 308 formed at the base portion 114 of the base frame 102. The clamping ledge 308 extends outward from the lateral sidewall 118. The clamping ledge 308 provides a clamping surface for external clamps to secure the base frame 102 to a machine table, tombstone, or work platform.

For example, clamps can be attached to the clamping ledge 308 for securing the modular vise system 100 to a machine table or workstation. It has been found that the clamping ledge 308 can include a width of one-fourth (¼) of an inch for providing a sufficient surface for attaching clamps. It has also been found that the clamping ledge 308 provides clamping flexibility for the modular vise system 100 as clamps can be attached to any position along the clamping ledge 308. The clamping ledge 308 can run along the entire length of the base frame 102.

The base frame 102 can also include an indexable mounting system 310 on the rail top surface 302 of the upper rail 116. The indexable mounting system 310 is a set of preconfigured holes for positing the center jaw 106 of FIG. 1 to set positions. For example, the set of holes for the indexable mounting system 310 can be used to offset the center jaw 106 for increasing the clamping size for the first jaw 104 or the second jaw 108.

The center jaw 106 can include screws and locating pins extending from the bottom surface of the jaw body 110 of FIG. 1 of the center jaw 106. The screws and locating pins can be used to position the center jaw 106 into a set of holes in the indexable mounting system 310. The indexable mounting system 310 can include bushing holes for locating the locating pins, such as dowel pins.

It has been found that the indexable mounting system 310 can provide a half inch to two inches of increased clamping space to the clamping area when the center jaw 106 is moved. The indexable mounting system 310 can be between the jaw anchor hole 306 and another of the jaw anchor hole 306 on the rail top surface 302. The indexable mounting system 310 can be formed on each of the upper rail 116 of the base frame 102.

The indexable mounting system 310 can include a dowel index hole 320 and a bushing index hole 322. The dowel index hole 320 is an interface for dowels or locating pins mounted on the center jaw 106. The dowel index hole 320 is used for quickly locating and aligning the center jaw 106 to the base frame 102. The dowel index hole 320 can include a depth of one inch for centering position pins and dowels. The dowel index hole 320 can be formed on a periphery of the indexable mounting system 310.

The indexable mounting system 310 can include the bushing index hole 322. The bushing index hole 322 is a reinforced hole that is compatible with both dowel pins and screws. The bushing index hole 322 can include a top portion that can interface with dowel pins on the center jaw 106. The top portion can include a depth of one inch for receiving the dowel pin. The bottom portion of the bushing index hole 322 can include a narrower threaded channel for receiving a screw. The screws can include a length of two inches.

It has been found that the two portions of the bushing index hole 322 provide mounting and quick change flexibility by allowing both locating dowels and screws to interface with the same hole. The position of the center jaw 106 can be quickly changed and centered using dowel pins in the bushing index hole 322. Further, screws can be inserted and secured within the bushing index hole 322 for a more secure lock.

The indexable mounting system 310 can include one of the dowel index hole 320 and a plurality of the bushing index hole 322. For example, the first rail 214 of the base frame 102 can include three of the bushing index hole 322 adjacent to the dowel index hole 320. The dowel index hole 320 can be on a periphery end of the indexable mounting system 310.

The second rail 216 can include the same configuration of the indexable mounting system 310 except that the dowel index hole 320 of the second rail 216 can be on the opposite periphery end of the base frame 102. The configuration of the indexable mounting system 310 allows for two dowels on the center jaw to be in a diagonal position to each other.

The indexable mounting system 310 allows the center jaw 106 to be quickly changed and aligned during operation of the vise. For example, a dowel on the right side of the center jaw 106 can be used to locate the center jaw 106 on the base frame 102, while a screw on the left side of the center jaw 106 allows the center jaw 106 to be tightly secured to the base frame 102. Dowels on the center jaw 106 can fit into any of the dowel or screw holes. The configuration and mounting options of the center jaw 106 will be explained in further detail below.

Figure 4A:
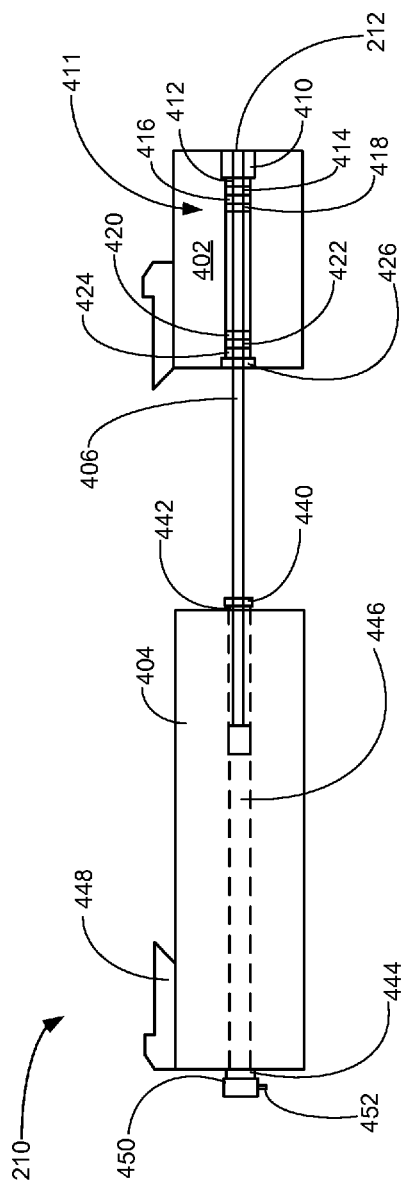
FIG. 4A is a detailed plan view of the jaw carrier assembly of FIG. 2.

Referring now to FIG. 4A, therein is shown a detailed plan view of the jaw carrier assembly 210 of FIG. 2. The jaw carrier assembly 210 can include a short nut 402, a receiving body 404, a lead screw 406, and the drive socket 212. The short nut 402 and the receiving body 404 are carriers for the sliding jaws, such as the first jaw 104 of FIG. 1.

The lead screw 406 is the main shaft for the modular vise system 100 of FIG. 1. For example, the lead screw 406 controls the clamping and unclamping operation of the jaws. Portions of the lead screw 406 are housed within the short nut 402 and the receiving body 404. To clamp the modular vise system 100, the lead screw 406 rotates within the short nut 402 and screws into the receiving body 404.

The lead screw 406 can include the drive socket 212 formed on a peripheral end of the lead screw 406. The drive socket 212 is exposed from an outer peripheral sidewall of the short nut 402. It has been discovered that the drive socket 212 is integrated direct on the periphery end of the lead screw 406, which prevents the need for separate adaptors or parts that would increase the footprint of the modular vise system 100.

Further, the integration of the drive socket 212 into the lead screw 406 provides a universal and flexible interface for operating the clamping mechanism of the modular vise system 100. Any socket wrench can be used with the drive socket 212 instead of a dedicated tool. The drive socket 212 can interface with a half-inch socket wrench.

A portion of the lead screw 406 can include threading on an opposite peripheral end of the lead screw 406 from the short nut 402. The threaded portion of the lead screw 406 screws into the receiving body 404. A central portion of the lead screw 406 can include a smooth shaft, which is between the drive socket 212 and the threading portion. It has been found that the central portion of the lead screw 406 is smooth to prevent chips and debris from entering the receiving body 404, as threading would allow debris to be lodged into the grooves.

The short nut 402 can include a shaft rotation system 411 housed within the short nut 402. The shaft rotation system 411 can include sets of thrust bearings and washer for securing the lead screw 406 and for allowing rotation of the lead screw 406 within the short nut 402.

The shaft rotation system 411 can include a front collar 410, a disc spring 412, a first washer 414, a first thrust bearing 416, a second washer 418, a third washer 420, a second thrust bearing 422, a fourth washer 424, and a rear collar 426. These components secure and suspend the lead screw 406 within the short nut 402.

The front collar 410 and the rear collar 426 seal the short nut 402, which prevents chips and debris from entering the short nut 402. The disc spring 412 is a spacer for separating the front collar 410 from the other rotating components of the shaft rotation system 411. Roller thrust bearings, such as the first thrust bearing 416, are rolling-element bearings that provide rotation for the lead screw 406.

The washers, such as the first washer 414, provide durability protection to the thrust bearings and the lead screw 406 by distributing the load. The third washer 420 and the fourth washer 424 can include a thin washer, which is thinner than the washers used for the first washer 414 and the second washer 418. The first washer 414 and the second washer 418 can include a thick washer.

The receiving body 404 can include a front plate 440, a shaft o-ring 442, a rear plate 444, and a threaded channel 446. The lead screw 406 can be inserted into the threaded channel 446 of the receiving body 404. The lead screw 406 can be also inserted through the front plate 440 and the shaft o-ring 442.

The front plate 440 is a cover plate that is attached to an inner side of the receiving body 404. The front plate 440 can include a hole to fit the lead screw 406 through the front plate 440. The shaft o-ring 442 can be in used to surround the lead screw 406 and provide a seal for the receiving body 404. The shaft o-ring 442 can be between the front plate 440 and the receiving body 404. The shaft o-ring 442 can be integrated into a groove formed into the lead screw 406. It has been found that the front plate 440 and the shaft o-ring 442 provide a seal for preventing chips and debris from entering the threaded channel 446 of the receiving body 404.

The receiving body 404 is internally threaded, allowing the lead screw 406 to screw in and screw out of the threaded channel 446. The length of the threaded channel 446 can include a length that can house the external portion of the main lead screw from the short nut 402.

The rear plate 444 is a cover plate for the back end of the receiving body 404. The outer side of the rear plate 444 is facing opposite from the short nut 402. The receiving body 404 can also include a mounting tang 448 for mounting the jaw carrier assembly 210 of FIG. 1 on the receiving body 404.

The jaw carrier assembly 210 can include the mounting tang 448 and a friction stop 450. The mounting tang 448 is an interface for docking with the jaw body 110 of FIG. 1. For example, the second jaw 108 of FIG. 1 can be mounted to the mounting tang 448 for attaching the second jaw 108 to the receiving body 404. Another mounting tang can be attached to the short nut 402.

The friction stop 450 is a structure or plate attached to the outer end of the receiving body 404. The friction stop 450 can be a platform for supporting a pin stop 452. The pin stop 452 is a rod or pin for restricting the movement of the receiving body 404. The pin stop 452 can include a screw with a soft metallic tip such as brass.

For example, the pin stop 452 can include a brass tipped screw and be inserted into a hole in the friction stop 450. The pin stop 452 can make contact with the channel top surface 304 of FIG. 3 of the base frame 102 of FIG. 1 for causing friction. It has been discovered that during operation of the modular vise system 100, the pin stop 452 can provide enough resistance and friction to prevent the movement of the receiving body 404 when the lead screw 406 is rotated. The pin stop 452 enables sequential jaw movement because the resistance prevents the receiving body 404 from sliding inward before the short nut 402.

As such, the short nut 402 will move toward the receiving body 404 until the short nut 402 reaches the center jaw 106 of FIG. 1, the receiving body 404, or the short nut 402 clamps onto an object between the first jaw 104 of FIG. 1 and the second jaw 108 of FIG. 1. After the short nut 402 has been clamped down, the screwing motion of the lead screw 406 can overcome the friction and resistance provided by the pin stop 452. After the resistance has been overcome, the receiving body 404 moves toward the short nut 402 during rotation of the lead screw 406 into the threaded channel 446.

The pin stop 452 can also lock down the position of the receiving body 404 during de-clamping. During de-clamping, the receiving body 404 can be loosened, allowing the clamped object to be released from the jaws. As the lead screw 406 is turned in the de-clamping direction, the receiving body 404 will press against the friction stop 450. The pin stop 452 in the friction stop 450 will restrict further movement of the receiving body 404, allowing the short nut 402 to loosen sequentially after the initial de-clamping of the receiving body 404. The clamped object clamped by the short nut 402 can be removed and both clamping stations can be used again.

It has been discovered that the pin stop 452 provides for a repeatable workflow process as multiple work items can be swapped quickly, replaced, and clamped using the sequential release mechanism described above. For example, four identical work pieces can be clamped and milled without having to completely reset the positions of the modular vise system 100. First, two work pieces can be clamped by the first jaw 104 and the second jaw 108.

Second, the first two work pieces can be de-clamped. The receiving body 404 will slide open until it contacts the friction stop 450, which would provide a small opening for removing the work piece. The short nut 402 will begin de-clamping because of the resistance provided by the pin stop 452. The two original work pieces can be replaced by two new work pieces and be clamped quickly without having to completely reset the positions of the jaws.

It has also been found that the pin stop 452 can be used to reset and position the jaw carrier assembly 210. The position of the receiving body 404 can be reset by loosening the pin stop 452 and sliding the receiving body 404 along the vise channel 305 of FIG. 3. To reset the positions of the jaws, the receiving body 404 can be moved to the periphery end of the vise channel 305 and the lead screw 406 can be turned to open the short nut 402 to a fully open position.

It has been discovered that the jaw carrier assembly 210 with the lead screw 406, the receiving body 404, and the short nut 402 includes a fully enclosed screw design, which eliminates the need for chip guards and other external accessories. The collars and plates of the jaw carrier assembly 210, such as the front collar 410, keep outside debris from entering the internal cavities of the short nut 402 and the receiving body 404. The enclosed screw design reduces clean up time and improves reliability to the modular vise system 100.

It has been found that the drive socket 212 includes half inch (½") internal square drive that is compatible with any standard ½" socket or impact wrench allowing for universal operation of the clamping mechanism of the modular vise system 100. The drive socket 212 can be formed or milled directly into the periphery end of the lead screw 406, which replaces the need for a vise tang.

Figure 4B:
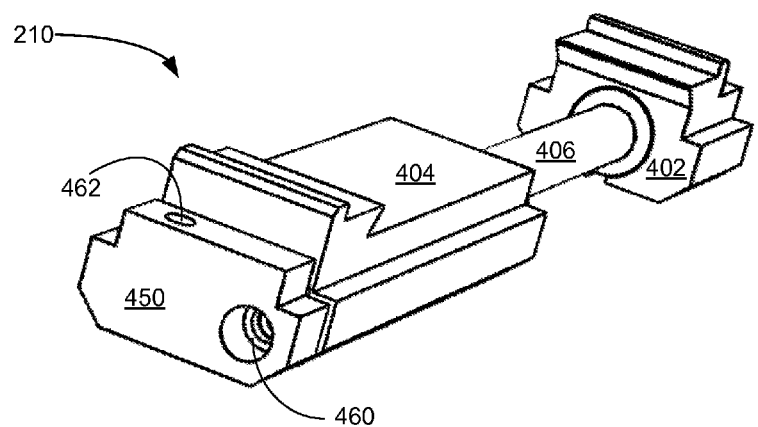
FIG. 4B is an isometric view of the jaw carrier assembly of FIG. 2.

Referring now to FIG. 4B, therein is shown an isometric view of the jaw carrier assembly 210 of FIG. 2. The isometric view can include the friction stop 450, the receiving body 404, the lead screw 406, and the short nut 402.

The friction stop 450 can include a spring hole 460, which is a screw hole. A screw can be inserted into the spring hole 460 for attaching the friction stop 450 to the receiving body 404. The spring hole 460 is formed through a lateral sidewall of the friction stop 450. The receiving body 404 also includes a screw hole aligned with the spring hole 460 of the friction stop 450.

The friction stop 450 can also include a stop hole 462, which is a screw hole for the pin stop 452 of FIG. 4A. The pin stop 452 can be inserted into the friction stop 450 through the stop hole 462. A portion of the pin stop 452 protrudes from the bottom of the friction stop 450. The stop hole 462 is formed through a top surface to the bottom surface of the friction stop 450.

Figure 4C:
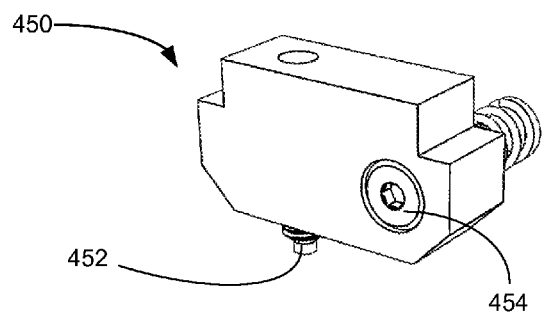
FIG. 4C is a first example isometric view of the friction stop of FIG. 4B.

Referring now to FIG. 4C, therein is shown a first example isometric view of the friction stop 450 of FIG. 4B. The example view includes a view of an outer side of the friction stop 450. The example view can include the pin stop 452. The example view includes a spring screw 454, which is a screw for connecting the friction stop 450 to the receiving body 404 of FIG. 4A.

The spring screw 454 can include a coiled spring wrapped around a screw shaft. The spring of the spring screw 454 provides compression resistance to the friction stop 450 and the receiving body 404 when the receiving body 404 is clamped close. It has been found that the spring screw 454 facilitates unclamping of the receiving body 404 by preventing the friction stop 450 from locking the receiving body 404 in place. The compression resistance from the spring pushing against the friction stop 450 and the receiving body 404 for providing slack to facilitate unclamping from a closed position.

Further, it has been found that the spring screw 454 facilitates the double vise movement of the modular vise system 100 of FIG. 1 during clamping. During clamping, the spring screw 454 helps drag the friction stop 450 to move along with the receiving body 404. Further, it has been found that the length of the spring screw 454 determines the amount of slack provided during unclamping. For example, the spring screw 454 can be screwed in tightly to reduce the amount of slacked given during unclamping of the jaws.

Figure 4D:
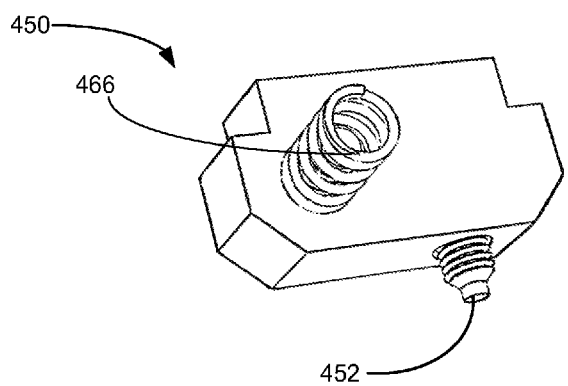
FIG. 4D is a second example isometric view of the friction stop of FIG. 4B.

Referring now to FIG. 4D, therein is shown a second example isometric view of the friction stop 450 of FIG. 4B. The example view includes a view of an inner side of the friction stop 450, which is directly attached to the receiving body 404 of FIG. 4A. The example view includes a coiled spring 466 of the spring screw 454 of FIG. 4C and the pin stop 452.

Referring now to FIG. 5, therein is shown a top view of the base frame 102. The top view shows the base frame 102 with the jaws and the jaw carrier assembly 210 of FIG. 4A removed. The top view can show the two parallel heat-treat harden rails over the base portion 114 of FIG. 1.

The base frame 102 can include a supplemental mounting hole 502, which is a screw hole for securing the modular vise system 100 of FIG. 1 to a work platform, tombstone, machine table, or workstation. For example, the supplemental mounting hole 502 provides additional interfaces for bolting and securing the modular vise system 100. It has been found that the supplemental mounting hole 502 provides additional flexibility and options for securing the modular vise system 100 to machine tables, tombstones, and work platforms.

The supplemental mounting hole 502 can be formed through the channel top surface 304 and pass through to the bottom surface of the base frame 102. For illustrative purposes, the modular vise system 100 can include five of the supplemental mounting hole 502. For example, the supplemental mounting hole 502 can be formed on each of the peripheral ends of the channel top surface 304. Three of the supplemental mounting hole 502 can be formed between the coupler interface 206 at the right end and the left end of the base frame 102.

The top view also depicts the jaw anchor hole 306 and the coupler interface 206. For illustrative purposes, the top view can also depict example dimensions and measurements for the modular vise system 100 in the 20-inch long configuration.

For example, the width of the rail top surface 302 of FIG. 3 can be 1.75" from point A to point B. The exposed width of the channel top surface 304 can be 2.5" from point B to point C. The width of the second rail can be 1.75" from point C to point D. The total width of the base frame 102 can be six inches.

The distance of the jaw anchor hole 306 can be two inches away from the peripheral edge of the rail top surface 302. For example, a distance of two inches can be measured from point E to the nearest periphery edge of the rail top surface 302 near point D.

Referring now to FIG. 6, therein is shown an end view of the base frame 102 of the modular vise system 100 of FIG. 1. The end view shows the jaw carrier assembly 210 of FIG. 1 and the jaws removed. The end view can show the vise channel 305, the upper rail 116, and the base portion 114 of the base frame 102.

The vise channel 305 runs along the entire length of the base frame 102. The jaw carrier assembly 210 of FIG. 2 can be inserted into the vise channel 305. The upper rail 116 prevents the jaw carrier assembly 210 from lifting up after being inserted into the vise channel 305. The jaw carrier assembly 210 can be inserted into the vise channel 305 at either end of the base frame 102.

The end view shows the clamping ledge 308 and the frame lock 122. The clamping ledge 308 is formed below the upper rail 116 and extends from the lateral sidewall 118 of the base portion 114. The clamping ledge 308 is directly between the lateral sidewall 118 and the base leg 218. The end view can also show the frame lock 122 extending from the bottom of the base frame 102.

Figure 7:
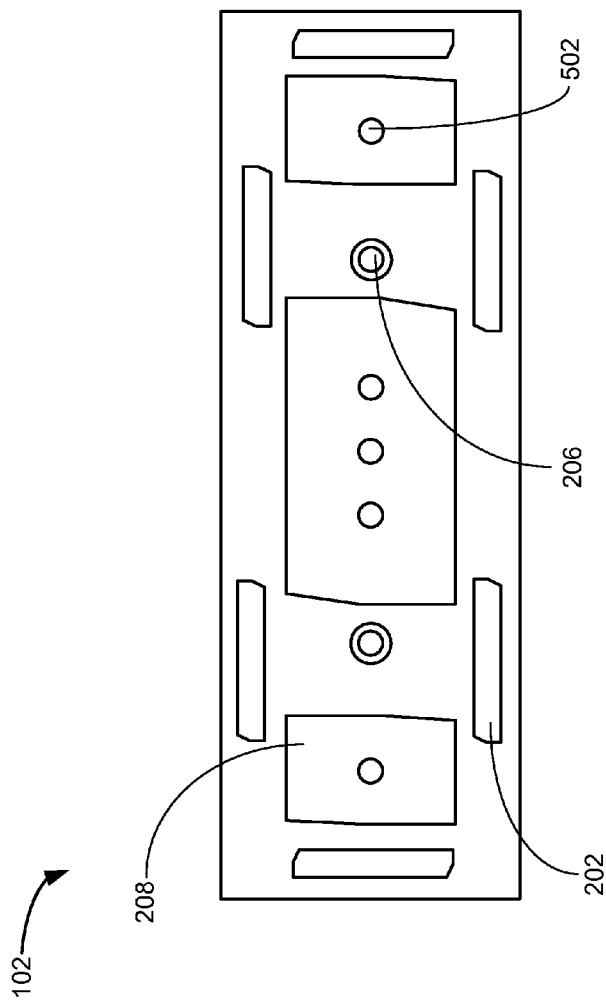
FIG. 7 is a bottom view of the modular vise system.

Referring now to FIG. 7, therein is shown a bottom view of the modular vise system 100 of FIG. 1. The bottom view can depict the bottom slot 202, the coupler interface 206, the relief plate 208, and the supplemental mounting hole 502. The base frame 102 can include six of the bottom slot 202 arranged along the entire perimeter of the bottom surface for providing flexible mounting options.

For illustrative purposes, the length of the base frame 102 can be twenty inches and the width of the base frame 102 of FIG. 1 can be six inches. The bottom surface of the base frame 102 is machined flat and ground. The modular vise system 100 can include three of the relief plate 208 machined into the bottom surface.

Figure 8A:
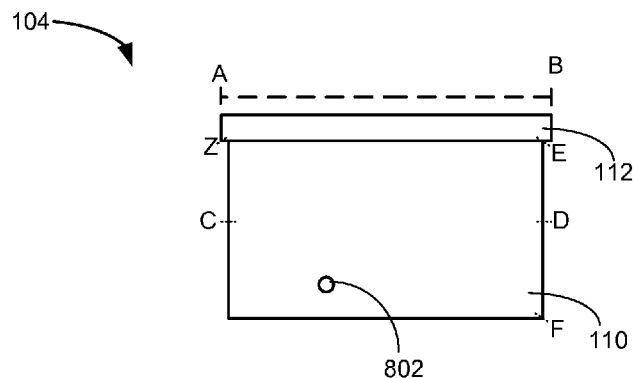
FIG. 8A is a detailed top view of the first jaw.

Referring now to FIG. 8A, therein is shown a detailed top view of the first jaw 104. The first jaw 104 is a movable or sliding jaw and can be identical to the second jaw 108 of FIG. 1. The detail view can show the jaw plate 112 and the jaw body 110.

The jaw plate 112 can include a modular jaw plate, which is an interchangeable plate. For example, the jaw plate 112 for the first jaw 104 can be identical to the jaw plate 112 used for the second jaw 108 and the center jaw 106 of FIG. 1. It has been found that interchangeable jaw plates can be used to swap out plates that have been damaged or need replacing.

The jaw body 110 can include an access hole 802, which is a hole for securing the jaw body 110 to the base frame 102 or for accessing screws beneath the jaw body 110. The access hole 802 can be formed on the top surface of the jaw body 110 and completely pass through to the bottom surface of the jaw body 110.

For illustrative purposes, the first jaw 104 can include example dimensions for compact operation on a six-inch frame. The jaw plate 112 can include a length of six inches, measured from point A to point B. The jaw plate 112 can include a width of three-fourths (¾) of an inch, measured from point A to point Z.

The jaw body 110 can include a length of the five and seven-eighths (5⅞) inches, measured from point C to point D. The jaw body 110 can include a width of four inches, measured from point E to point F.

Figure 8B:
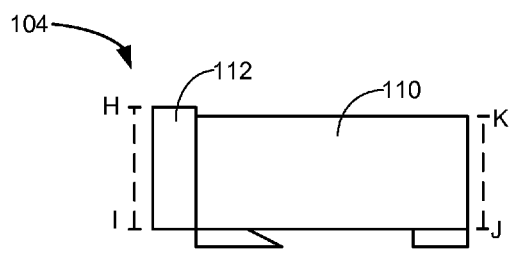
FIG. 8B is a side view of the first jaw of FIG. 1.

Referring now to FIG. 8B, therein is shown a side view of the first jaw 104 of FIG. 1. The side view can include the jaw plate 112 and the jaw body 110. The jaw body 110 can include mounting tangs on the bottoms surface of the jaw body 110. The mounting tangs can be used to dock with the short nut 402 of FIG. 4 and the receiving body 404 of FIG. 4, which provides for the clamping mechanism of the modular vise system 100 of FIG. 1.

The jaw plate 112 can include a height of one and three-fourths (¾) of an inch, measured from point H to point I. The jaw body 110 can include a height of one and five-eighths (⅝) inches, measured from point J to point K.

Figure 8C:
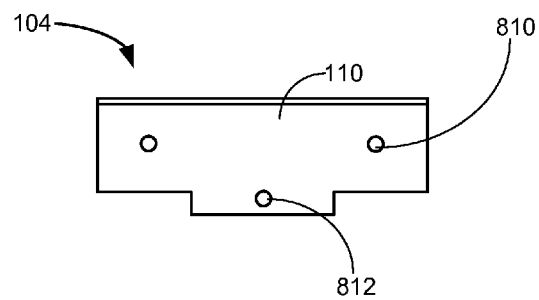
FIG. 8C is an example end view of the jaw body taken from an outer end.

Referring now to FIG. 8C, therein is shown an example end view of the jaw body 110 taken from an outer end. The example can show the first jaw 104 although it is understood that the first jaw 104 can be identical to the second jaw 108 of FIG. 1. The example shows a side of the jaw body 110 facing opposite to the jaw plate 112 of FIG. 1. The example view can include an accessory hole 810 and an attachment screw 812.

The accessory hole 810 is a screw hole for attaching accessories and other components to the jaw body 110. The accessory hole 810 can be threaded. The attachment screw 812 can be used to secure the jaw body 110 to the jaw carrier assembly 210 of FIG. 2. For example, the attachment screw 812 can be used to secure the jaw body 110 to the short nut 402 of FIG. 4A.

Figure 8D:
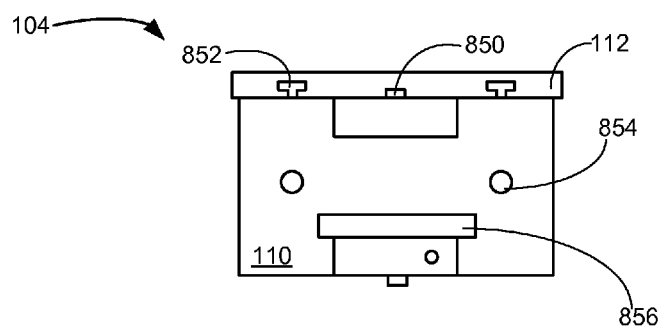
FIG. 8D is a bottom view of the first jaw of FIG. 1.

Referring now to FIG. 8D, therein is shown a bottom view of the first jaw 104 of FIG. 1. The bottom view can include the bottom surface of the jaw plate 112 and the bottom surface of the jaw body 110. The bottom view of the first jaw 104 can be identical to the second jaw 108 of FIG. 1.

The bottom surface of the jaw plate 112 can include a dowel slot 850 and a screw slot 852. The jaw plate 112 can include two screw slots with the dowel slot 850 between the screw slot 852 and another of the screw slot 852. The dowel slot 850 and the screw slot 852 of the jaw plate 112 will be explained in further detail below.

The jaw body 110 can include a dowel hole 854 and a mounting recess 856. The dowel hole 854 is a hole for inserting dowels, pins, or rods into the jaw body 110. For example, the jaw body 110 can include two dowel holes for inserting into the jaw anchor hole 306 of FIG. 3. The dowels lock in the jaws and prevent the sliding jaw from moving during operating of the vise.

The dowels allow the jaw body 110 to be located quickly to 0.0005" repeatability and the ability to lock down quickly the first jaw 104 or the second jaw 108. Further, the dowels inserted into the dowel hole 854 transform the movable jaws into fixed jaws for single station or reverse-single station vise operation. The mounting recess 856 is a recess in the jaw body 110 for docking with the mounting tang 448 of FIG. 4A.

Figure 9A:
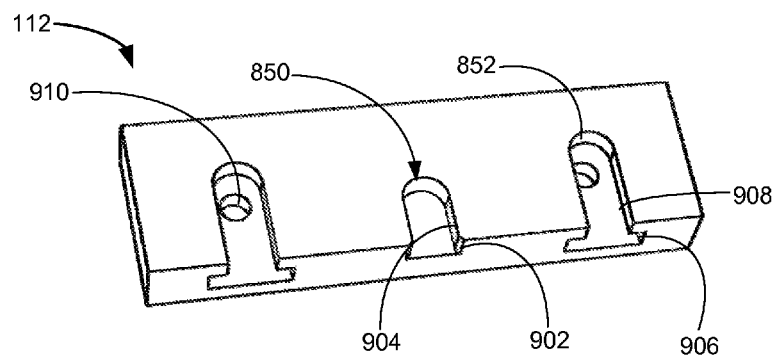
FIG. 9A is an example isometric view of the jaw plate.

Referring now to FIG. 9A, therein is shown an example isometric view of the jaw plate 112. The example view can show an inner side of the jaw plate 112 that contacts and faces the jaw body 110 of FIG. 1, when attached. The example view can include the dowel slot 850 and the screw slot 852.

The dowel slot 850 can include a dowel slot opening 902 and a dowel slot track 904. The dowel slot opening 902 is wider than the dowel slot track 904 for locking the jaw plate 112 to the jaw body 110. The dowel slot 850 provides for quick and precise locating when attaching the jaw plate 112 to the jaw body 110. For example, dowel pins or rods can be mounted on the jaw body 110 for interfacing with the dowel slot 850 of the jaw plate 112.

The screw slot 852 can include a screw slot opening 906 and a screw slot track 908. The screw slot opening 906 is wider than the screw slot track 908 for locking the jaw plate 112 to the jaw body 110. For example, a wide head screw, such as a head cap screw can slide into the screw slot opening 906 and travel along the screw slot track 908. The narrow rails of the screw slot track 908 prevent the pull out of the head cap screw.

The screw slot 852 can include a fastening hole 910 for fastening and tightening the jaw plate 112 to the jaw body 110. The access hole 802 can pass completely through the screw slot 852 for providing access to the fastening screw from the front end of the jaw plate 112.

The dowel slot 850 and the screw slot 852 of the jaw plate 112 provide a quick change mechanism for the modular vise system 100 of FIG. 1. For example, it has been found that the dowel slot 850 and the screw slot 852 provide a mechanism for quickly and accurately installing the jaw plate 112 onto the jaw body with dowel pins and wide head screws. The screw slot 852 and the fastening hole 910 allow fastening screws to be loosened slightly, and the jaw plate 112 can be quickly removed by sliding the jaw plate 112 upwards and away from the jaw body 110.

Thus, the fastening screws do not have to be completely removed to remove and switch the jaw plate 112. The fastening hole 910 provides accessibility to the fastening screws because the outer jaw plate surface can be easily reached. The jaw plate 112 can be quickly installed by aligning a dowel pin and fastening screws of the jaw body into the dowel slot 850 and the screw slot 852 and dropping the jaw plate 112 into place.

A dowel pin aligns the jaw plate 112, and the fastening hole 910 provides quick access to the screws for fastening the jaw plate 112 to the jaw body 110. Further, dowels or locating pins on the jaw body 110 provide a 0.0005" repeatability when aligning the jaw plate 112 to the jaw body 110.

For example, the jaw plate 112 includes an interface with three special slots integrated into a backside of the jaw plate 112. The left and right slots allow the jaw plate 112 to slide right over head cap screws, which are attached to the jaw body 110.

It has been discovered that the dowel slot 850 can receive a dowel pin, which functions as a locating pin, to help center and align the jaw plate 112. For example, an operator slides the jaw plate 112 over the two screws and the center dowel pin and can tighten the two screws quickly to secure the jaw plate 112 to the jaw body 110.

Figure 9B:
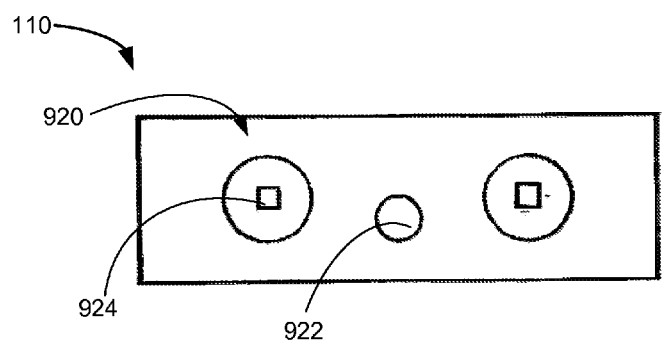
FIG. 9B is an example side view of the jaw body.

Referring now to FIG. 9B, therein is shown an example view of the jaw body 110. The example view shows the front face of the body which contacts with the jaw plate 112 of FIG. 9A. The example view can include a plate interface 920. The plate interface 920 can include a locating pin 922 and a plate screw 924.

The locating pin 922 can be attached to an inner side of the jaw body 110 that contacts the jaw plate 112 of FIG. 1. The locating pin 922 can include a locating pin, a rod, or a dowel. The locating pin 922 is used for locating and aligning the jaw plate 112 to the jaw body 110. The locating pin 922 can slide into the dowel slot 850 of FIG. 8D from the bottom surface of the jaw plate 112.

The plate screw 924 can be attached to an inner side of the jaw plate 112 that contacts the jaw plate 112. The plate screw 924 can include a screw with a wide head, such as a socket head cap screw, that can fit into the screw slot opening 906 of FIG. 9A. The plate screw 924 slides into a narrow channel from than the screw slot opening 906 and the head of the screw slides up the screw slot track 908 of FIG. 9A. The head of the plate screw 924 is held in place beneath the rails of the screw slot 852.

The head of the plate screw 924 can include a hex key or head for an Allen wrench. The wide head of the plate screw 924 prevents pull out of the jaw plate 112, when the plate screw 924 is inserted into the screw slot track 908. The plate screw 924 and the locating pin 922 can include a length of one inch and the locating pin 922 can include a width of half an inch.

Figure 9C:
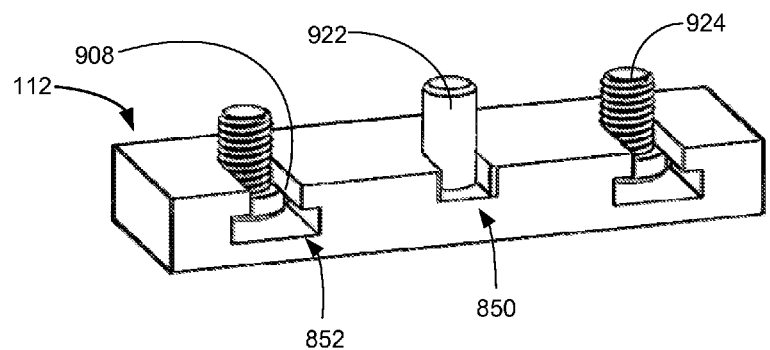
FIG. 9C is an isometric example view of the jaw plate.

Referring now to FIG. 9C, therein is shown an isometric example view of the jaw plate 112. The example view includes the locating pin 922 and the plate screw 924 inserted into the dowel slot 850 and the screw slot 852. The head of the plate screw 924 is shown wedged beneath the rails of the screw slot track 908 with a shaft of the plate screw 924 extending out of the narrow opening of the screw slot 852.

Figure 9D:
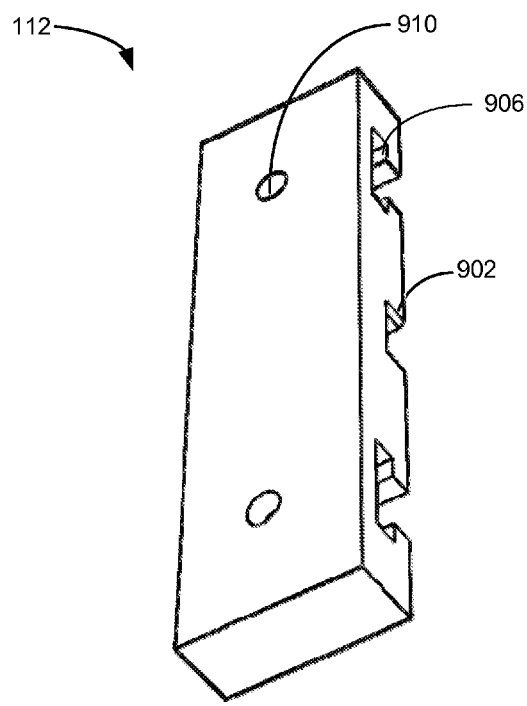
FIG. 9D is an example isometric view of an outer side of the jaw plate.

Referring now to FIG. 9D, therein is shown an example isometric view of an outer side of the jaw plate 112. The outer side of the jaw plate 112 can include the face of the jaw plate 112, which is a side facing opposite to the jaw body 110 of FIG. 1.

The example view can include the fastening hole 910, the screw slot opening 906, and the dowel slot opening 902. The fastening hole 910 provides access to the plate screw 924 of FIG. 9B. For example, an Allen wrench can be inserted into the fastening hole 910 to allow a quick tightening of the plate screw 924. The fastening screws within the fastening hole 910 would only require a half turn to screw and align the jaw plate 112 to the jaw body 110. The plate screw 924 of FIG. 9B secures the jaw plate 112 to the jaw body 110 preventing separation and for resisting shear force.

Figure 10A:
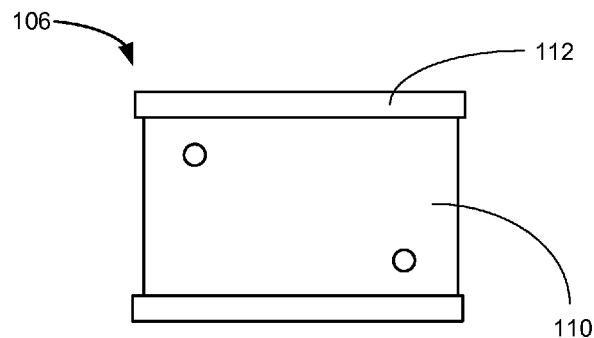
FIG. 10A is a top view of the center jaw.

Referring now to FIG. 10A, therein is shown a top view of the center jaw 106. The top view can include the jaw body 110 and the jaw plate 112 mounted to both ends of the jaw body 110. The center jaw 106 can include similar components and structures as the first jaw 104 of FIG. 1 and the second jaw 108 of FIG. 1 except that the center jaw 106 includes an addition plate on the backend of the jaw body 110.

Figure 10B:
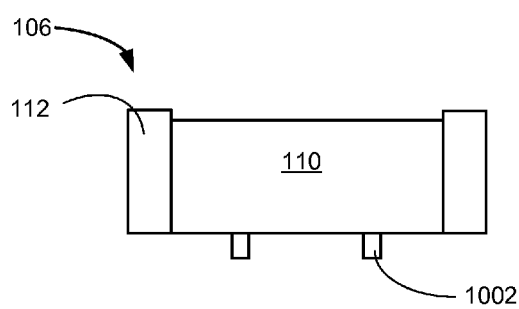
FIG. 10B is a side view of the center jaw.

Referring now to FIG. 10B, therein is shown a side view of the center jaw 106. The side view can include the jaw plate 112 and the jaw body 110 of the center jaw 106. The example view can also show two pins protruding from a bottom surface of the center jaw 106.

The center jaw 106 can include a center pin 1002. The center pin 1002 is a locating pin or rod for locating and aligning the center jaw 106 to the indexable mounting system 310 of FIG. 3. The center pin 1002 can include a dowel, a pin, or a rod.

Figure 10C:
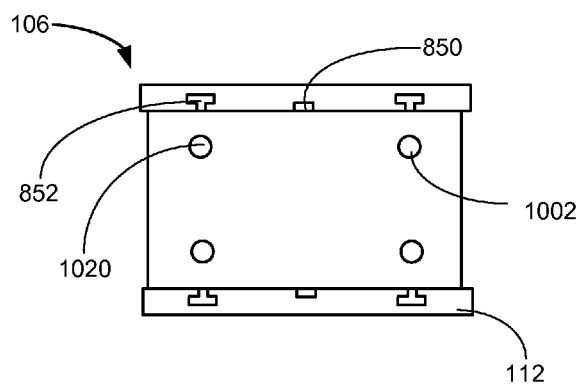
FIG. 10C is a bottom view of the center jaw.

Referring now to FIG. 10C, therein is shown a bottom view of the center jaw 106. The bottom view includes four main holes in a rectangular pattern and two diagonally opposed thru-bolt holes for screws to attach the center jaw 106 to the main vise body. The center pin 1002 can be inserted into the main holes.

The example view includes a center screw 1020. The center screw 1020 is a screw attached to the bottom surface of the center jaw 106. The center screw 1020 can screw into the bushing index hole 322 of FIG. 3. The center screw 1020 is positioned diagonal to another of the center screw 1020. The center screw 1020 can be two inches long.

The center pin 1002 can be inserted into the dowel index hole 320 of FIG. 3 or the bushing index hole 322. It has been found that the center pin 1002 is one inch long to fit into the top portion of the bushing index hole 322. The center screw 1020 can screw into the bottom portion of the bushing index hole 322 for securing the center jaw 106 to the base frame 102 of FIG. 1. The center screw 1020 can be two inches long to reach the bottom portion of the bushing index hole 322. The center pin 1002 and the dowel index hole 320 can locate the center jaw 106 to a repeatability of 0.0005".

The center jaw 106 only requires that two of the center pin 1002 be inserted into the main holes at diagonal holes for locking the center jaw 106 to the indexable mounting system 310 of FIG. 3. It has been found that the dowel index hole 320 on the periphery of the indexable mounting system 310 can be used to save materials as only the center pin 1002 is needed for securing the center jaw 106. The center jaw 106 can include the jaw plate 112 and the jaw body 110. The bottom view can also show the dowel slot 850 and the screw slot 852 of the jaw plate 112.

Figure 11:
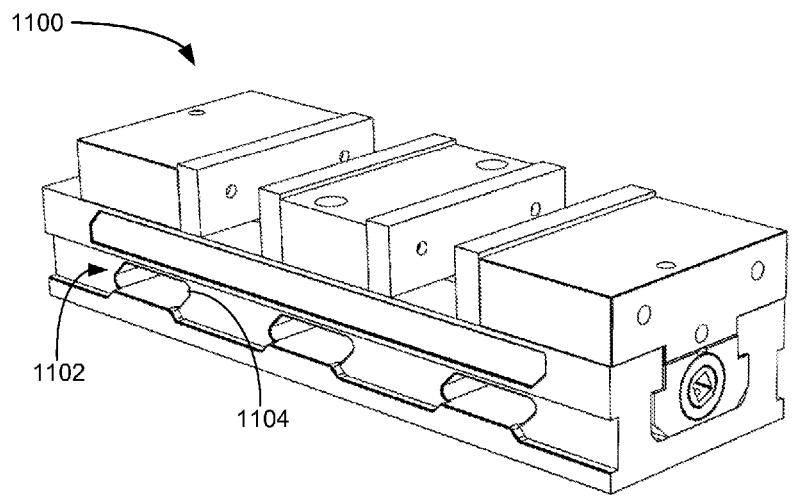
FIG. 11 is an isometric view of the modular vise system in a second embodiment of the present invention.

Referring now to FIG. 11, therein is shown an isometric view of a modular vise system 1100 in a second embodiment of the present invention. The modular vise system 1100 can include the same components as the modular vise system 100 of FIG. 1 except that the modular vise system 1100 can also include a rounded handhold 1102.

The rounded handhold 1102 can include a parallelogram shape and can include a rounded corner 1104. The rounded handhold 1102 is similar to the handhold vent 120 of FIG. 1 except that that rounded handhold 1102 is shaped to be more accommodating to the human hand. For example, the rounded corner 1104 at each corner prevent pinching and provide a smooth surface to prevent abrasion to human skin.

Further, it has been found that the parallelogram shape of the rounded handhold 1102 facilities lifting because the protruding corner of the parallelogram is shaped to fit the human index finger and palm, when a hand is inserted into the rounded handhold 1102. The parallelogram shape and rounded corners provide an ergonomic handgrip for handling the modular vise system 1100. The rounded handhold 1102 provides a strong gripping structure for lifting and moving the modular vise system 1100.

The rounded handhold 1102 can include the other advantages and benefits of the handhold vent of FIG. 1. For example, it has been found that the rounded handhold 1102 provides a hole for debris and chip evacuation. Further, the rounded handhold 1102 reduces the overall weight of the base frame 102 of FIG. 1, which facilitates movement of the frame in a workshop.

Figure 12A:
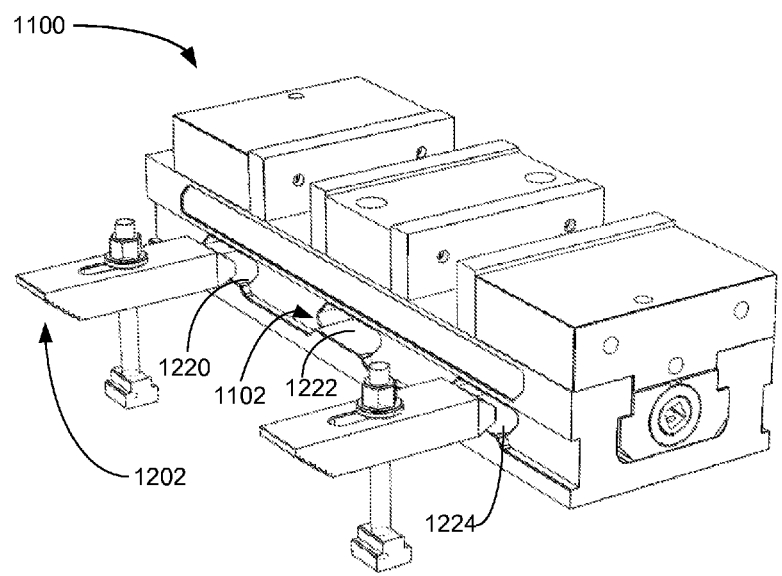
FIG. 12A is a first example view of the modular vise system.

Referring now to FIG. 12A, therein is shown a first example view of the modular vise system 1100. The example view can show clamping options integrated into the base frame 102 of FIG. 1. The example view can include a clamp kit 1202 attached the module vise system 1100.

The clamp kit 1202 can include the components of a step clamp with T-nuts, bars, blocks, and screws used to screw the clamp to the rounded handhold 1102 and another work surface. The rounded handhold 1102 can function in a similar manner to a step block used in hold-down sets.

The clamp kit 1202 is shown inserted into the rounded handhold 1102, however, it is understood that the clamp kit 1202 can also be inserted and clamped into the handhold vent 120 of FIG. 1. The rounded handhold 1102 and the handhold vent 120 provide additional clamping options for securing the modular vise system 100 to a tombstone and a machine or work table. The rounded handhold 1102 provides for flexibility in clamping and securing the modular vise system 1100 with any available clamp in a workshop and many different types of clamps can be used to clamp the modular vise system 1100 and the modular vise system 100 of FIG. 1.

The modular vise system 1100 can include a plurality of the rounded handhold 1102. For example, the module vise system 1100 can include a first rounded handhold 1220, a second rounded handhold 1222, and a third rounded handhold 1224. The first rounded handhold 1220, the second rounded handhold 1222, and the third rounded handhold 1224 can be formed equal spaced or equally distance from each other on in the lateral sidewall 118 of FIG. 1.

It has been found that the equally spaced handholds provide coverage for the entire frame of the base frame 102 for chip evacuation and reduce the overall weight of the modular vise system 1100. Further, it has been found that the arrangement and spacing of the first rounded handhold 1220, the second rounded handhold 1222, and the third rounded handhold 1224 provide gripping access to the entire frame and thus facilitate lifting and positioning the base frame 102. It is understood that the handhold vent 120 of FIG. 1 can include an identical arrangement and positioning for providing the same benefits as the rounded handhold 1102.

Figure 12B:
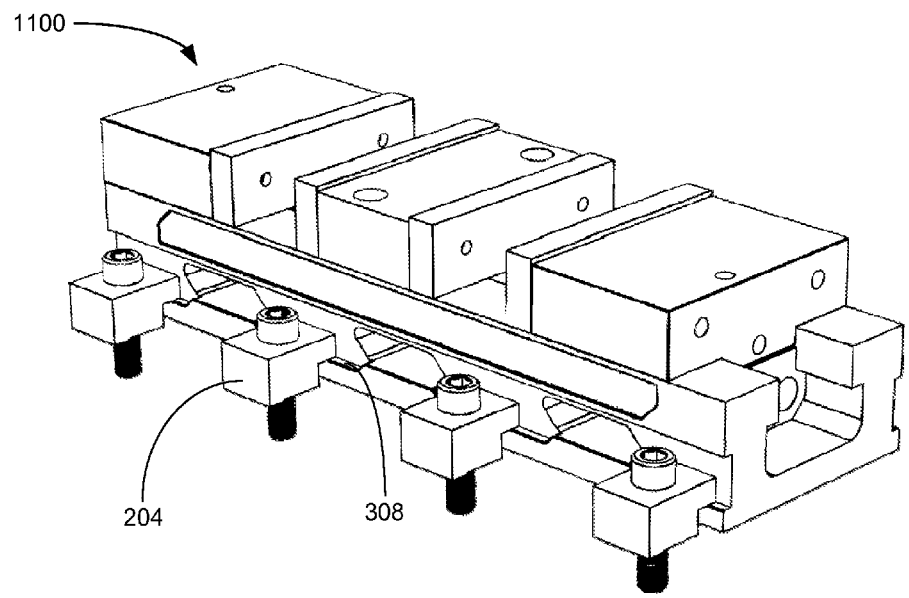
FIG. 12B is a second example view of the modular vise system.

Referring now to FIG. 12B, therein is shown a second example view of the modular vise system 1100. The example view can include the toe clamp 204, which is similar to the clamp shown in FIG. 2. The toe clamp 204 can be attached to the clamping ledge 308. It has also been discovered that the quarter inch (¼") width of the clamping ledge 308 provides enough surface area to securely clamp the modular vise system 1100 to a working platform or machine table using the toe clamp 204.

Figure 12C:
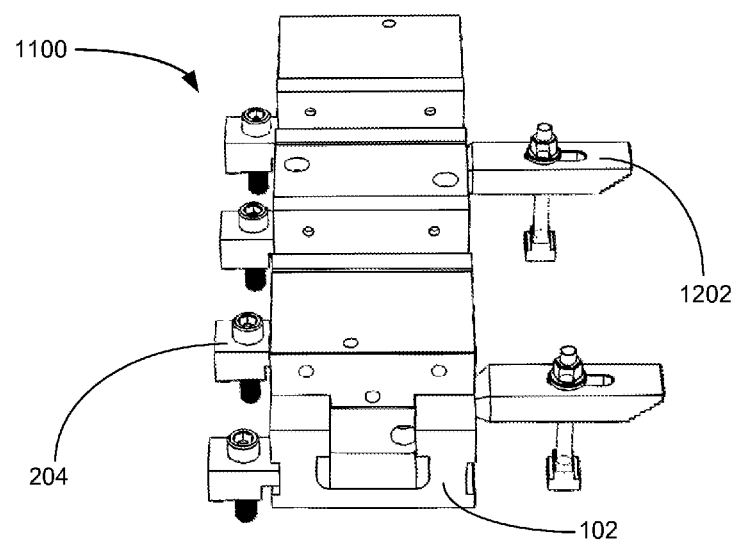
FIG. 12C is a third example view of the modular vise system.

Referring now to FIG. 12C, therein is shown a third example view of the modular vise system 1100. The example view can include both the toe clamp 204 and the clamp kit 1202 attached to the modular vise system 100 of FIG. 1.

The example view shows how the base frame 102 can use a combination of external clamps. The toe clamp 204 can be clamped on the clamping ledge 308 of FIG. 12B for securing the base frame 102.

The clamp kit 1202 is shown attached to the opposite side of the base frame 102 from the toe clamp 204. It has been discovered that the design and configuration of the rounded handhold 1102 and the clamping ledge 308 provide clamping and mounting flexibility for operating the modular vise system 1100. For example, the rounded handhold 1102 and the clamping ledge 308 provide surfaces for mounting any available clamps, which provides workflow flexibility. Securing clamps can be interchangeable or mixed and matched with the use of a plurality of the toe clamp 204 mixed with a plurality of the clamp kit 1202.

A length of the clamping ledge 308 runs along the entire length of the base frame 102, which allows clamps to be attached to any portion of the clamping ledge 308. For example, if the length 101 of FIG. 1 of the base frame 102 is twenty inches, the clamping ledge 308 provides a clamping surface at any location along the length 101. It has been found that the clamping ledge 308 provides flexibility in clamping the modular vise system 1100 into CNC mill machines, which have chambers with limited workspace and clamping surfaces.

Referring now to FIG. 13A, therein is shown a detailed isometric top view of the frame lock 122 of FIG. 1. The frame lock 122 functions as a docking mechanism for attaching the base frame 102 of FIG. 1 to a work platform, tombstone, or machine table. The frame lock 122 can include a coupler body 1302, a locking ball 1304, a mounting interface 1306, a ring 1308, and a locking screw 1310.

The coupler body 1302 is a metallic housing for the components of the frame lock 122. The coupler body 1302 can be formed into a cylinder shape, although it is understand that the coupler body 1302 can also include a rectangle or square shape. For example, the external appearance of the coupler body 1302 can be similar to a socket nut.

The coupler body 1302 can include a plurality of internal channels for housing other components of the frame lock 122. The coupler body 1302 can include a diameter of one and a half (1.5) inches for providing a holding force of over 10,000 pounds.

The locking ball 1304 can include a metallic ball that can protrude from the coupler body 1302. The locking ball 1304 can be housed within one of the channels of the coupler body 1302. The locking ball 1304 can be used for locating and aligning, when the locking ball 1304 are protruded and locked. It has been found that the locking ball 1304 can include five-eighth inch (⅝") harden balls, as this size provides a clamping or holding strength of over 10,000 pounds and is able to align the frame lock 122 within a plus or minus 0.0005" or better locating repeatability. It has been found that the locking ball 1304 can be formed from an alloy steel, which is hardened to HRC 60 for providing over 10,000 pounds of holding force.

The frame lock 122 can include at least one of the locking ball 1304. For illustrative purposes, the frame lock 122 can include three of the locking ball 1304, which are positioned equally distance from each other around the perimeter of the coupler body 1302. Further, it is understood that the frame lock 122 can also be configured to include only two of the locking ball 1304 or four of the locking ball 1304 in other configurations.

The mounting interface 1306 can include a socket screw or screw shaft for securing the frame lock 122 to the coupler interface 206 of FIG. 2. The mounting interface 1306 is thread and can screw directly into the coupler interface 206 of FIG. 2. A top surface of the mounting interface 1306 can include a screw hole for the locking screw 1310.

The locking screw 1310 can be inserted through a top surface of the mounting interface 1306. The locking screw 1310 is a screw, which controls the protrusion and locking of the locking ball 1304. For example, when the locking screw 1310 is tightened and screwed into the top surface of the coupler body 1302, the locking screw 1310 causes the locking balls to protrude from the sidewalls of the coupler body 1302. It has been found that the ⅝" size of the locking ball 1304 allows a single turn of the locking screw 1310 for locking the locking balls in a protruding position. This feature provides a quick lock for the frame lock 122 as a small twist of an Allen wrench on the locking screw 1310 can engage or disengage the locking ball 1304.

The ring 1308 is a circular band that secures the locking ball 1304 within the chambers of the coupler body 1302. The ring 1308 can include a polymer material, such as rubber. The locking ball 1304 is between the ring 1308 and the mounting interface 1306. The ring 1308 will be explained in further detail below.

The frame lock 122 can be used to secure or mount and locate the modular vise system 100 of FIG. 1 or the modular vise system 1100 of FIG. 11 to a table or tombstone. For example, a bottom surface 1326 of the frame lock 122 can be inserted into a docking ring. When the three locking balls are locked into position, the base frame 102 is aligned and located to the docking platform. It has been discovered that the frame lock 122 with the locking ball 1304 can lock and secure the attached vise to a table or tombstone with a 0.0005" of repeatability.

Further, the materials and thickness of the frame lock 122 provide adequate holding force for supporting the modular vise system 100 and metal pieces for use in machining. It has been discovered that the coupler body 1302 with a HRC of fifty, the locking ball 1304 with a HRC of sixty, and the diameter of the coupler body 1302 of one and a half inches of can provide over ten thousand pounds of holding force.

Referring now to FIG. 13B, therein is shown a detailed view of the internal channels of the frame lock 122 of FIG. 13A. The detailed view can include the locking screw 1310 and the locking ball 1304. The detailed view can show the channels formed into the coupler body 1302 of FIG. 13A.

The frame lock 122 can include a ball channel 1320, a top channel 1322, and a top ball 1324. The top channel 1322 is a cavity formed below the mounting interface 1306 of FIG. 13A of the coupler body 1302. The top channel 1322 can house the top ball 1324 and the locking screw 1310. The top channel 1322 forms a vertical hole from the mounting interface 1306 to a central portion of the coupler body 1302.

The ball channel 1320 is a cavity that is formed extending laterally from the center of the coupler body 1302 to the sidewalls. The top channel 1322 is above the ball channel 1320. The frame lock 122 can include three ball channels with the openings of each of the ball channel 1320 configured as the outer points of a triangle. The ball channel 1320 can house the locking ball 1304. In a unlock position, the top ball 1324 sits on top of the locking balls in a four-ball pyramid configuration. The ball channel 1320 can include a diameter of ⅝" for housing the locking balls.

When the locking screw 1310 is tightened down from a top surface of the mounting interface 1306, the locking screw 1310 presses down on the top ball 1324. The top ball 1324 pushes down on the three locking balls below the top ball 1324 and the locking balls are force to protrude from the respective ball channels.

The locking screw 1310 is threaded to be secured in place, which prevents the top ball 1324 from sliding up the top channel 1322. For example, the three balls of the locking ball 1304 are locked in place because the top ball 1324 is locked in place by the locking screw 1310. The protruding action of the locking ball 1304 centers and aligns the coupler body 1302 within a docking ring.

When the locking screw 1310 is unscrewed, it provides room for the top ball 1324 to slide up the top channel 1322. This allows the locking ball 1304 to retract inward into the ball channel 1320 and the frame lock 122 can be removed from a docking ring. The balls naturally will retract due to the exerted force on the balls, the round surface of the balls, and the elastic properties of the ring 1308 of FIG. 13A, which help the locking ball 1304 roll back into the ball channel 1320.

When the locking screw 1310 is unscrewed, the entire vise attached to the frame lock 122 can be lifted off the tombstone or machine table and placed on another work platform, such as a CNC milling machine. The locking ball 1304 provides locating and alignment of the base frame 102 of FIG. 1 with a 0.0005" repeatability.

In another embodiment, the locking screw 1310 can be replaced with a push-spring locking mechanism with a quarter-turn lock. The push-spring can activate a piston that provides the same function as the top ball 1324. It has also been found that a push-spring locking mechanism can quickly secure and disengage the frame lock 122 from a receiver or dock for modular use of the modular vise system 100. The quarter-turn lock can provide additional safety and reliability in a push-spring lock configuration. The push-spring locking mechanism will be explained in further detail below.

It has been found that the locking mechanism of the frame lock 122 allows for the modular vise system 100 to be quickly attached and detached from workstations and worktables. It has also been found that the frame lock 122 and a docking ring allow the modular vise system 100 to be accurately replaced on tombstones and work platforms with a 0.0005" repeatability. The frame lock 122 removes the need to indicate, mark, and align the vise within a CNC mill for uniformity between machining operations.

Referring now to FIG. 13C, therein is shown a detailed isometric bottom view of the frame lock 122. The bottom view depicts the bottom surface 1326 of the frame lock 122, which is a side of the frame lock 122 opposite to a top surface of the mounting interface 1306. The bottom surface 1326 of the frame lock 122 can include a socket head for screwing the frame lock 122 into the coupler interface 206 of FIG. 2. The hex size of the socket head can be 0.75 inches.

The mounting interface 1306 of the frame lock 122 can be inserted and screwed into the coupler interface 206 of FIG. 2. An Allen wrench can be used to tighten or screw the frame lock 122 as the frame lock 122 can function like a bolt or stud. After attachment to the base frame 102 of FIG. 1, the frame lock 122 can be docked into a docking ring, table, or tombstone. The locking screw 1310 of FIG. 13A can be tightened from the channel top surface 304 of FIG. 3 of the base frame 102 of FIG. 3.

Figure 13F:
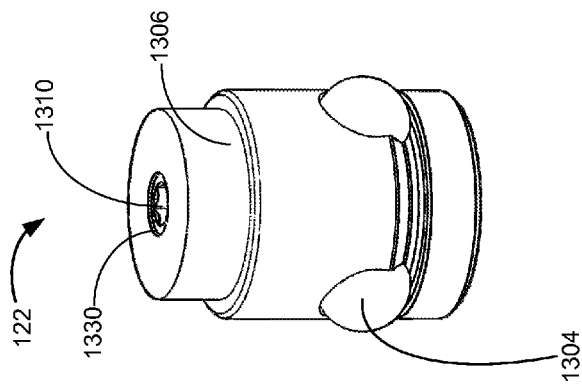
FIG. 13F is a third example isometric view of the frame lock.
Figure 13E:
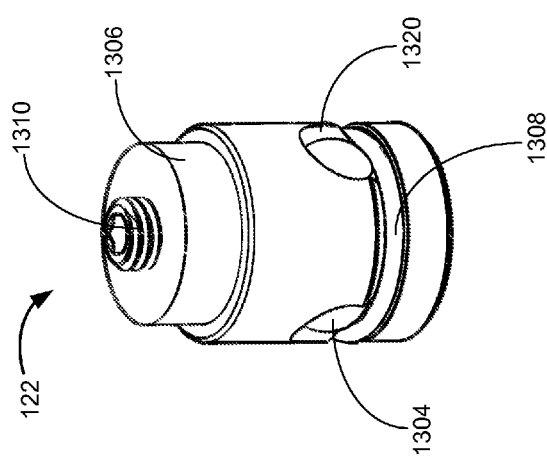
FIG. 13E is a second example isometric view of the frame lock.
Figure 13D:
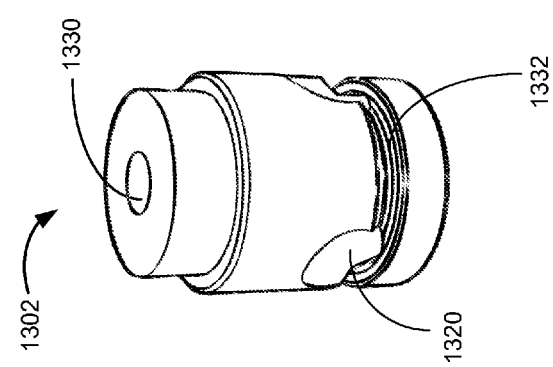
FIG. 13D is a detailed example isometric view of the coupler body.

Referring now to FIG. 13D, therein is shown a detailed example isometric view of the coupler body 1302. The example view can show the coupler body 1302 with the locking screw of FIG. 13A, the locking ball 1304 of FIG. 13A, and the ring 1308 of FIG. 13A removed.

The example view can include a ring trench 1332, an top screw hole 1330, and the ball channel 1320. The ring trench 1332 is a grove or trench around a perimeter of the coupler body 1302. The ring 1308 fits around the ring trench 1332 to allow the locking ball 1304 to be inserted and removed from the coupler body 1302. The ring 1308 prevents the locking ball 1304 from falling out of the ball channel 1320. Further, it has been found that the elastic properties of the ring 1308 facilitate the retraction of the locking ball 1304 into the ball channel 1320 when the frame lock 122 of FIG. 13A is unlocked.

The ring trench 1332 is integrated into the bottom portion of the ball channel 1320. For example, after the deep holes for the ball channel 1320 are formed, a shallow trench is then formed beginning at the opening of the ball channel 1320 and completely around the coupler body 1302. The ring trench 1332 is formed into the bottom portion of the ball channel 1320 and the coupler body 1302.

The width of the ring trench 1332 can include a range of a half (½) to a third (⅓) of the diameter of the ball channel 1320. In a preferred embodiment, the ring trench 1332 covers a third of the diameter of the ball channel 1320 at the bottom portion. The width of the ring trench 1332 determines the width of the ring 1308 of FIG. 13A.

The partial coverage of the ball channel 1320 by the ring 1308 allows two-thirds of the locking ball 1304 of FIG. 13A to be exposed, while the ring 1308 secures a third of the locking ball 1304 from falling out of the ball channel 1320. It has been found that the exposed portions of the locking ball 1304 from the ring 1308 provides enough surface area for a holding force of over 10,000 pounds (lbs.). The ring 1308 also allows the locking balls to be removed and replaced from the coupler body 1302.

Referring now to FIG. 13E, therein is shown a second example isometric view of the frame lock 122. The example view shows the frame lock 122 in an unlocked position. The locking screw 1310 is shown not screwed into the mounting interface 1306. A portion of the locking screw 1310 extends above a top surface of the mounting interface 1306. The locking ball 1304 is shown retracted into the ball channel 1320.

The ring 1308 can include a fluorocarbon-based synthetic rubber, which is strong enough to hold the locking balls within the channels but stretch enough to allow the locking ball 1304 to protrude from the ball channel 1320. The outer diameter of the ring 1308 can include a width of 1.318 inches and the inner diameter of the ring 1308 can include a width of 1.112 inches.

Referring now to FIG. 13F, therein is shown a third example isometric view of the frame lock 122. The example view shows the frame lock 122 in a locked position. The locking screw 1310 is shown screwed into the mounting interface 1306 and completely within the top screw hole 1330.

The locking screw 1310 presses down on the top ball 1324 of FIG. 13B with the top ball 1324 pressing down on three locking balls below the top ball 1324. Each of the locking ball 1304 protrudes from the ball channel 1320 of FIG. 13B. It has been found that the locking ball 1304 can protrude 0.15" out of the ball channel 1320, which provides enough force and grip to center and align the frame lock 122 and for providing over 10,000 pounds of holding force.

Referring now to FIG. 14A, therein is shown a frame lock 1400 in a second embodiment of the present invention. The frame lock 1400 can include the coupler body 1302 and a locking assembly 1402. The locking assembly 1402 can include a push-spring locking mechanism.

The locking assembly 1402 can include a trigger mechanism for locking and unlocking the locking ball 1304. The locking assembly 1402 can be used to replace the function of the locking screw 1310 of FIG. 13A and the top ball 1324 of FIG. 13B. The locking assembly 1402 can be inserted into the top screw hole 1330.

The locking assembly 1402 can include a locking button 1404, a locking collar 1406, a thrust device 1408, and a coupler shaft 1410. The locking button 1404 is formed on a periphery end of the coupler shaft 1410. The locking button 1404 can be pushed or toggled for engaging the thrust device 1408. The locking button 1404 can include a quarter turn locking system to prevent the button from being toggled.

The thrust device 1408 can slide down the coupler shaft 1410 and press against the locking balls within the coupler body 1302. The thrust device 1408 can include internal springs that press against the locking collar 1406 for moving the thrust device 1408 down the coupler shaft 1410. When the locking button 1404 is unlocked, the thrust device 1408 can slide back up the coupler shaft 1410 allowing the locking balls to retract into the coupler body 1302.

Referring now to FIG. 14B therein is shown an example diagram with a receiver ring 1420 and the frame lock 1400. The frame lock 1400 can be identical to the frame lock 122 of FIG. 1 except that the frame lock 1400 includes the locking assembly 1402.

The frame lock 1400 and the frame lock 122 of FIG. 1 can be inserted into the receiver ring 1420 for securing the base frame 102 of FIG. 1 to a tombstone or work platform. The receiver ring 1420 is a docking ring, which can be installed or formed into tables and tombstones.

The receiver ring 1420 can include a round hole 1422 or an oblong hole 1424. In the configuration with the round hole 1422, the frame lock 1400 and the frame lock 122 can be fully located in the x and y directions. The locking balls including a diameter of ⅝" pushes against the inner walls of receiver ring 1420 having the round hole 1422 for centering and aligning the fame lock 1400 within the receiver ring 1420.

The receiver ring 1420 having the oblong hole 1424 can be used to dock the frame lock 1400 in only the Y direction. For example, the configuration of the receiver ring 1420 having the oblong hole 1424 can be similar to a diamond-locating pin. The different configurations for the receiver ring 1420 can be used in tandem on a tombstone, work platform, or machine table.

It has been found that the receiver ring 1420 can include an alloy steel such as 8620 alloy steel with a hardness of HRC 60-62 for durability and hold strength. For example, the steel composition of the receiver ring 1420 and the structural strength of the frame lock 1400 and an HRC hardness of 60 for both the receiver ring 1420 and the frame lock 14000 can produce a holding force of over 10,000 pounds. The mounting torque for the receiver ring 1420 can be 10 ft-lbs.

The receiver ring 1420 can be installed into any worktable, workbench, platform, or workstation. The receiver ring 1420 can also be installed into an external frame that is secured and anchored to any worktable or workspace. It has been found that the modular vise system 100 of FIG. 1 with the receiver ring 1420 can be moved and secured to multiple worktables and stations in the workshop for increasing utility and manufacturing options in a workshop. It has been found that the frame lock 122 docked to the receiver ring 1420 can be implemented shop-wide at any station or terminal equipped with the receiver ring 1420 for quick, accurate, and modular workshop operations.

Figure 15:
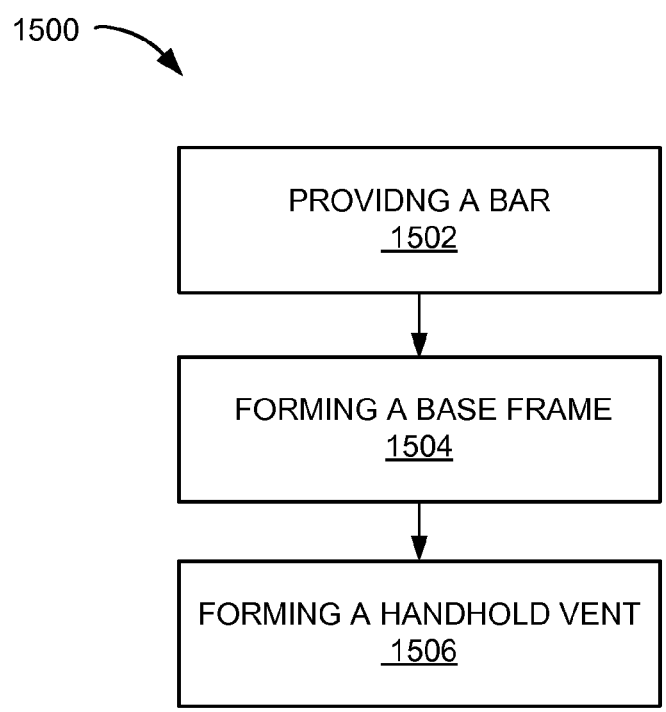
FIG. 15 is a flow chart of a method of manufacture of the modular vise system in a further embodiment of the present invention.

Referring now to FIG. 15, therein is shown a flow chart of a method 1500 of manufacture of the modular vise system 100 of FIG. 1 in a further embodiment of the present invention. The method 1500 includes: providing a bar in a block 1502; forming a base frame from the bar including: forming a base portion, forming a first rail and a second rail, the first rail and the second rail above the base portion, and forming a vise channel in the base portion, the vise channel between the first upper rail and the second upper rail in a block 1504; and forming a handhold vent in a lateral sidewall of the base portion in a block 1506.

Yet other important aspects of the embodiments include that it valuably supports and services the historical trend of reducing costs, simplifying systems, and increasing performance. These and other valuable aspects of the embodiments consequently further the state of the technology to at least the next level.

Thus, it has been discovered that the embodiments of the vise system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing vise systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A vise system comprising:
    a base frame having an upper rail, a base portion, and a vise channel;
    a handhold vent in a lateral sidewall of the base portion, the handhold vent for chip evacuation of an inter side of the base portion and for gripping;
    a coupler interface formed on a bottom side of the base portion;
    a frame lock for interfacing with the coupler interface, the frame lock for mounting and for table alignment, the frame lock includes:
        a coupler body having a cylinder shape, the coupler body having at least three internal channels,
        locking balls for protruding through the internal channels of the coupler body,
        a ring attached to a surface of the coupler body for securing the locking balls within the internal channels, and
        a locking assembly for controlling a protrusion of the locking balls for table alignment, the locking assembly includes a push-spring trigger mechanism for locking and unlocking the locking balls; and
    a jaw carrier assembly within the vise channel of the base frame, the jaw carrier assembly includes a friction step for restricting movement; and
    a jaw assembly attached to the jaw carrier assembly.

2. The system as claimed in claim 1 wherein the handhold vent includes a rounded handhold with a rounded corner.

3. The system as claimed in claim 1 further comprising a clamping ledge extending from the lateral sidewall of the base portion.

4. The system as claimed in claim 1 further comprising a bottom slot on a bottom surface of the base portion.

5. The system as claimed in claim 1 wherein the upper rail includes a jaw anchor hole through a rail top surface.

6. The system as claimed in claim 1 wherein the base frame includes a hardness of 50 on the Huge Rockwell C Scale.

7. The system as claimed in claim 1 wherein the handhold vent includes a parallelogram shape for providing an ergonomic handgrip.

8. The system as claimed in claim 1 where the handhold vent includes a length of three and, a half inches.

9. The system as claimed in claim 1 wherein the base portion includes a relief plate on the bottom surface.

10. A vise system comprising:
    a base frame having an upper rail, a base portion, and a vise channel;
    a rounded handhold in a lateral side all of the base portion, the rounded handhold for chip evacuation of an inner side of the base portion and for gripping;
    a coupler interface formed on a bottom side of the base portion;
    a frame lock for interfacing with the coupler interface, the frame lock for mounting and for table alignment, the frame lock includes:
        a coupler body having a cylinder shape, the coupler body having at least three internal channels,
        locking balls for protruding through the internal channels of the coupler body,
        a ring attached to a surface of the coupler body for securing the locking balls within the internal channels, and
        a locking assembly for controlling a protrusion of the locking balls for table alignment, the locking assembly includes a push-spring trigger mechanism for locking and unlocking the locking balls; and
    a jaw carrier assembly within the vise channel of the base frame, the jaw carrier assembly includes a friction stop for restricting movement; and
    a jaw assembly attached to the jaw carrier assembly.

11. The system as claimed in claim 10 wherein the rounded handhold includes a parallelogram shape for providing an ergonomic handgrip.

12. The system as claimed in claim 10 wherein the jaw assembly includes a first jaw, a second jaw, and a center law mounted on the jaw carrier assembly.

13. The system as claimed in claim 10 further comprising a clamping ledge extending from the lateral sidewall, the clamping ledge having a width of a quarter of an inch.

14. The system as claimed in claim 10 wherein the base frame includes a first rounded handhold, a second rounded handhold, and a third rounded handhold.

15. A method of manufacture of a vise system comprising:
    providing a bar;
    forming a base frame from the bar including:
        forming a base portion,
        forming a coupler interface on a bottom side of the base portion,
        forming a first rail and a second rail, the first rail and the second rail above the base portion, and
        forming a vise channel in the base portion, the vise channel between the first rail and the second rail; and
    forming a handhold vent in a lateral sidewall of the base portion, the handhold vent for chip evacuation of an inner side of the base portion and for gripping; and
    forming a frame lock for interfacing with the coupler interface, the frame lock for mounting and for table alignment, forming the frame lock includes:

forming a coupler body having a cylinder shape, the coupler body having at least three internal channels, forming locking balls for protruding through the internal channels of the coupler body, forming a ring attached to a surface of the coupler body for securing the locking balls within the internal channels, and forming locking assembly for controlling a protrusion of the locking balls for table alignment, the locking assembly includes a push-spring trigger mechanism for locking and unlocking the locking balls.

16. The method as claimed in claim 15 wherein forming the handhold vent includes forming a rounded handhold having a rounded corner.

17. The method as claimed in claim 15 wherein forming the base frame includes forming the coupler interface on a channel top surface of the base portion.

18. The method as claimed in claim 15 wherein forming the base frame includes forming a clamping ledge extending from the lateral sidewall of the base portion.

19. The method as claimed in claim 15 further comprising installing a jaw carrier assembly into the vise channel, the jaw carrier assembly includes a friction stop for restricting movement.

* * * * *